United States Patent [19]
Miyagi

[11] Patent Number: 5,627,821
[45] Date of Patent: May 6, 1997

[54] DEFECT NOTIFICATION METHOD IN A MULTIPOINT ATM NETWORK

[75] Inventor: Morihito Miyagi, Tokyo, Japan

[73] Assignee: Hitachi, Ltd., Tokyo, Japan

[21] Appl. No.: 404,748

[22] Filed: Mar. 15, 1995

[30] Foreign Application Priority Data

Mar. 15, 1994 [JP] Japan .................................. 6-043527

[51] Int. Cl.$^6$ ...................................................... H04L 1/00
[52] U.S. Cl. ........................... 370/242; 370/248; 370/307
[58] Field of Search ................................ 370/13, 13.1, 14, 370/15, 17, 54, 110.1, 60, 60.1; 371/20.5

[56] References Cited

U.S. PATENT DOCUMENTS 5,233,600  8/1993  Pekarske ..................................... 370/14
5,321,688  6/1994  Nakano et al. ............................. 370/14

OTHER PUBLICATIONS

*International Telegraph & Telephone Consultative Committed/COM XVIII-R 122-E*, "Study Group XVIII –Report R 122", Jul. 1992, Period 1989–1992.
ITU–T Recommendation 1.361, Integrated Servies Digital Network (ISDN) (Mar. 1993).

*Primary Examiner*—Melvin Marcelo
*Attorney, Agent, or Firm*—Antonelli, Terry, Stout & Kraus, LLP

[57] ABSTRACT

A defect notification method and apparatus for use in a multipoint ATM network so as to avoid the transmission of defect notification cells in an overlapped manner. In the invention when a connecting point detects a defect in a lower layer and when the connecting point is not a branching point the connecting point sends a first defect notification signal in the downstream direction of a first connection. When the connecting point receives the first defect notification signal and when the connecting point is a branching point, the connecting point terminates the first defect notification signal, sends a quasi-defect notification signal in the downstream direction of the first connection, and returns a second defect notification signal in the downstream direction of a second connection in the opposite direction of the first connection. Connecting points in the downstream direction of the first connection transfer the quasi-defect notification signal in the downstream direction of the first connection without processing and end points, upon receiving the quasi-defect notification signal, execute a predetermined state transition.

51 Claims, 20 Drawing Sheets

FIG. 10

| | | | |
|---|---|---|---|
| VPI=10 | 0 | 0 | 400 : VP TABLE |
| VPI=11 | 1 | 0 | |
| VPI=12 | 1 | 1 | |
| VPI=13 | 1 | 0 | |
| VPI=14 | 0 | 0 | |
| VPI=15 | 1 | 1 | |
| VPI=16 | 1 | 0 | |

403 : FIELD INDICATING BRANCHING CONNECTION(YES : 0 NO : 0)

402 : FIELD INDICATING ENABLED CONNECTION (ENABLED : 1, DISABLED : 0)

DEFECT NOTIFICATION METHOD IN A MULTIPOINT ATM NETWORK

BACKGROUND OF THE INVENTION

The present invention relates to a defect notification method and apparatus in a multipoint ATM network. More particularly the present invention relates to a defect notification method and apparatus in a multipoint ATM network for preventing defect notification signals from being generated in an overlapped manner from a plurality of leaf nodes in the network and preventing undesired defect notification signals from merging on a root node in the network.

Recommendation I. 610 "Broadband (B-)ISDN Operation and Maintenance Principles and Functions" approved by WTSC (World Telecommunications Standard Conference) March 1993 (hereinafter abbreviated as ITU-TI. 610) by ITU-T (International Telecommunication Union-Telecommunication Standardization Sector) stipulates a defect notification method in a "point-to-point ATM connection" but do not stipulate a defect notification method in a "multipoint ATM connection". According to the defect notification method in a point-to-point ATM connection (hereinafter explained with reference to VP: virtual path), a device that has detected a section defect (or a defect of the lower layer as viewed from the ATM layer) sends a VP - AIS (VP-Alarm Indication Signal) cell in the downstream direction of the ATM connection that is multiplexed on the defective section. The VP - AIS cell is terminated and detected by a first device that is an end point of the ATM connection, and it is recognized that the ATM connection is defective. In response to the reception of the VP - AIS cell, the first device sends a VP - FERF (VP - far end receive failure) cell to the ATM connection which forms a pair with respect to the defective ATM connection and is in the opposite direction relative thereto. The VP - FERF cell is terminated and detected by a second device that is an end point of the ATM connection in the opposite direction. This makes it possible to recognize the presence of a defective point in the ATM connection which is on the source side as viewed from the above device.

Without anything stipulated under ITU - TI. 610, however, the defect notification method in the above-mentioned point-to-point ATM connection must be directly expanded to the multipoint ATM connection. FIGS. 8A–B illustrate the flow of notification signals occurring when a defect notification method in the conventional point-to-point ATM connection is adapted to a multipoint connection shown in FIG. 6. The multipoint ATM connection shown in FIG. 6 comprises a source end point (hereinafter referred to as root), a plurality of sink end points (hereinafter referred to as leaves), one or more connecting points with branch, and connecting points without branch, and does not lose general performance of the multipoint ATM connection (VPC: virtual path connection or VCC: virtual channel connection).

In the example of FIG. 6, the end point of the multipoint connection has a root R and leaves L1, L2, L3 and L4. As the connecting points, there are points B1, B2 and B3 with branch and points C1 and C2 without branch. Here, the root R is, for example, an exchange included in the network, the leaves L1 to L4 are terminals or exchanges, and the connecting points B1 to C2 are exchanges or transmission equipment. The connections correspond to VPC or VCC, and are divided into several links by the above-mentioned end points and connecting points. In this example, the links include S1 (between R and C1), S2 (between C1 and B1), S3 (between B1 and C2), S4 (between C2 and B2), S5 (between B2 and L1), S6 (between B2 and L2), S7 (between B1 and B3), S8 (between B3 and L3), and S9 (between B3 and L4). The connections can be defined to be a connection in the downward direction from the root to the leaves and a connection in the upward direction from the leaves to the root. The connection in the downward direction of FIG. 6 is shown in FIG. 7A and the connection in the upward direction is shown in FIG. 7B. In this specification, the connections of links Si (i=1 to 9) in the downward direction are expressed as Sdi (i=1 to 9) and in the upward direction are expressed as Sui (i=1 to 9).

According to the conventional defect notification method as shown in FIG. 8A, when the lower layer becomes defective, for example, in a link Sd1, the connecting point C1 adjacent to the defective point on the downstream side inserts a AIS cell in the downstream connection. Then, as shown in FIG. 8B, the leaves L1 to L4 that have received the AIS cell sends the VP - FERF cell back to the upstream connection. However, the disadvantage of the conventional defeat notification method is that a plurality of VP - FERF cells sent from the leaves L1 to L4 merge at the connecting points where the AIS cell is branched, thereby multiplying the band by the number of merging points at the connection points (B1, B2, B3) in the connection in the opposite direction and multiplying the band at the root R which is the end point by the number of leaves.

SUMMARY OF THE INVENTION

The object of the present invention is to provide a defect notification method and apparatus which do not permit the band to be increased by the VP - FERF cell streams that merge at merging points or roots in a multipoint ATM network.

In order to achieve the above-mentioned object according to the defect notification method and apparatus of the present invention in a multipoint ATM network, the node that has detected a defect at a first connection in the downstream direction transmits a first defect notification signal (e.g., VP - AIS cell) in the downstream direction of the first connection. A second defect notification signal (e.g., VP - FERF cell) is sent in the downstream direction of the second connection corresponding to the upward direction of the first connection which forms a pair with respect to the second connection when a first branching node (connecting point having branch) encountered on the first connection has received the first defect notification signal. The nodes on the second connection sequentially transmit the second defect notification signal.

The second defect notification signal is sequentially transmitted up to the end point of the second connection by the nodes on the second connection. When a branching node is encountered on the second connection the branching node terminates the second defect notification signal that is received from the upstream side. However, if the node encountered on the second connection is not a branching node the second defect notification is sequentially transmitted up to the end point of the second connection.

In the first connection, the branching node that has first received the first defect notification signal transmits a quasi-defect notification signal such as a VP - MAIS cell related to the VP - AIS cell for multipoint use instead of transmitting the first defect notification cell in the downstream direction of the first connection. The VP - MAIS cell may include the VP - AIS cell and data indicating multipoint use. Upon receiving the quasi-defect notification signal, the nodes on the first connection sequentially transmit the quasi-defect notification signal up to the connection end point.

According to the defect notification method and apparatus of the present invention, the first defect notification signal (VP - AIS cell) sent from a node that has detected a defect is terminated by a first branching node encountered on the first connection, and this branching node sends the second defect notification signal (VP - FERF cell) on the second connection toward the root of the first connection. Therefore, there is no probability that the second defect notification signals are generated from a plurality of nodes to merge on the second connection. The branching node that has terminated the first defect notification signal (VP - AIS cell) also sends a quasi-defect notification signal (VP - MAIS cell) to the downstream direction of the first connection instead of the first defect notification signal. The branching nodes and the end points (leaves) encountered in the downstream direction of the first connection do not generate second defect notification signals in response to the quasi-defect notification signal but simply transmit to the quasi-defect notification signal without generating the second defect notification signal. Thus, the defect is notified to the nodes on the first connection by using the quasi-defect notification signal while suppressing the generation of useless second defect notification signals.

BRIEF DESCRIPTION OF THE DRAWINGS

The present invention will be more apparent from the following detailed description, when taken in conjunction with the accompanying drawings, in which:

FIG. 10 is a diagram illustrating the construction of a table used in the node of FIGS. 9A and 9B;

DETAILED DESCRIPTION OF THE PREFERRED EMBODIMENTS

Embodiments of the present invention will now be described with reference to the drawings.

Figure 1A:
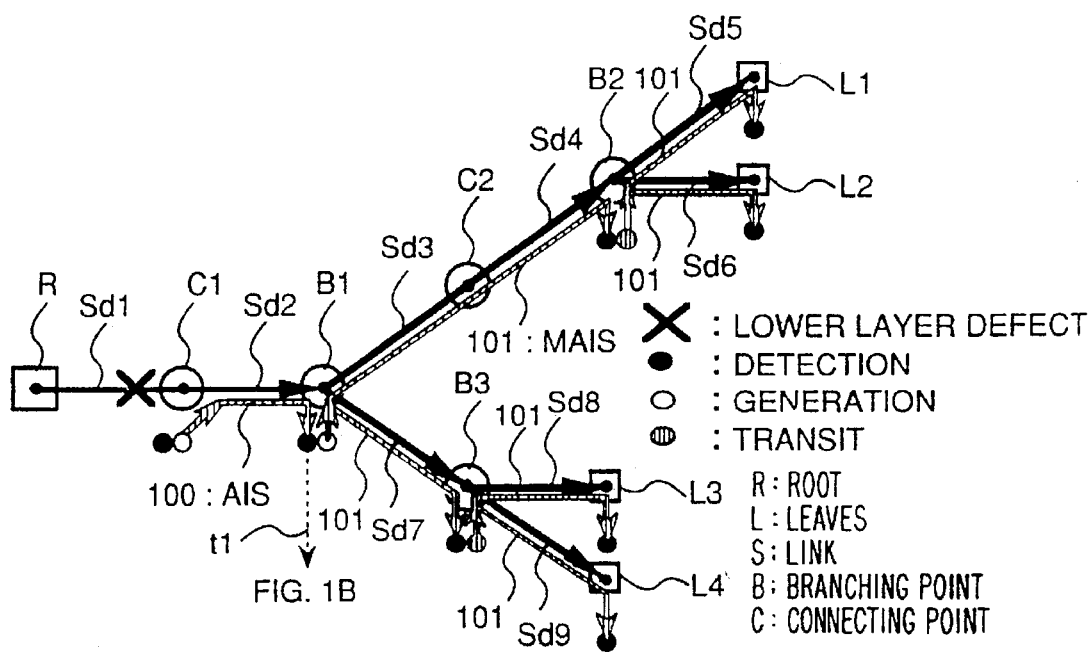
FIGS. 1A and 1B are diagrams for explaining a first example of defect notification according to the present invention.
Figure 1B:
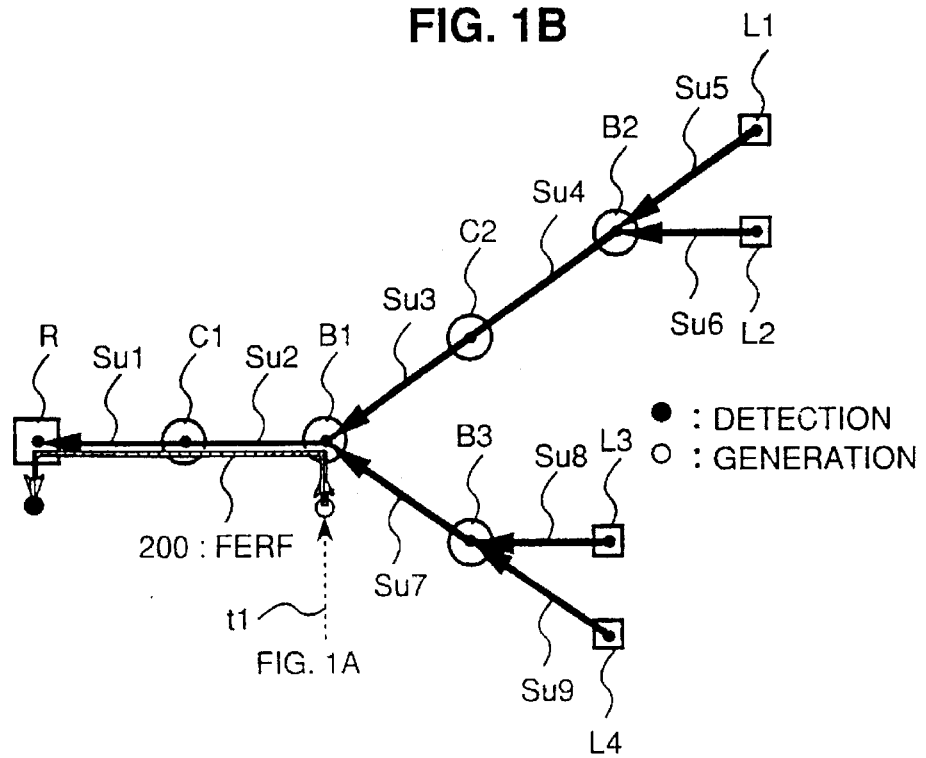
Figure 6:
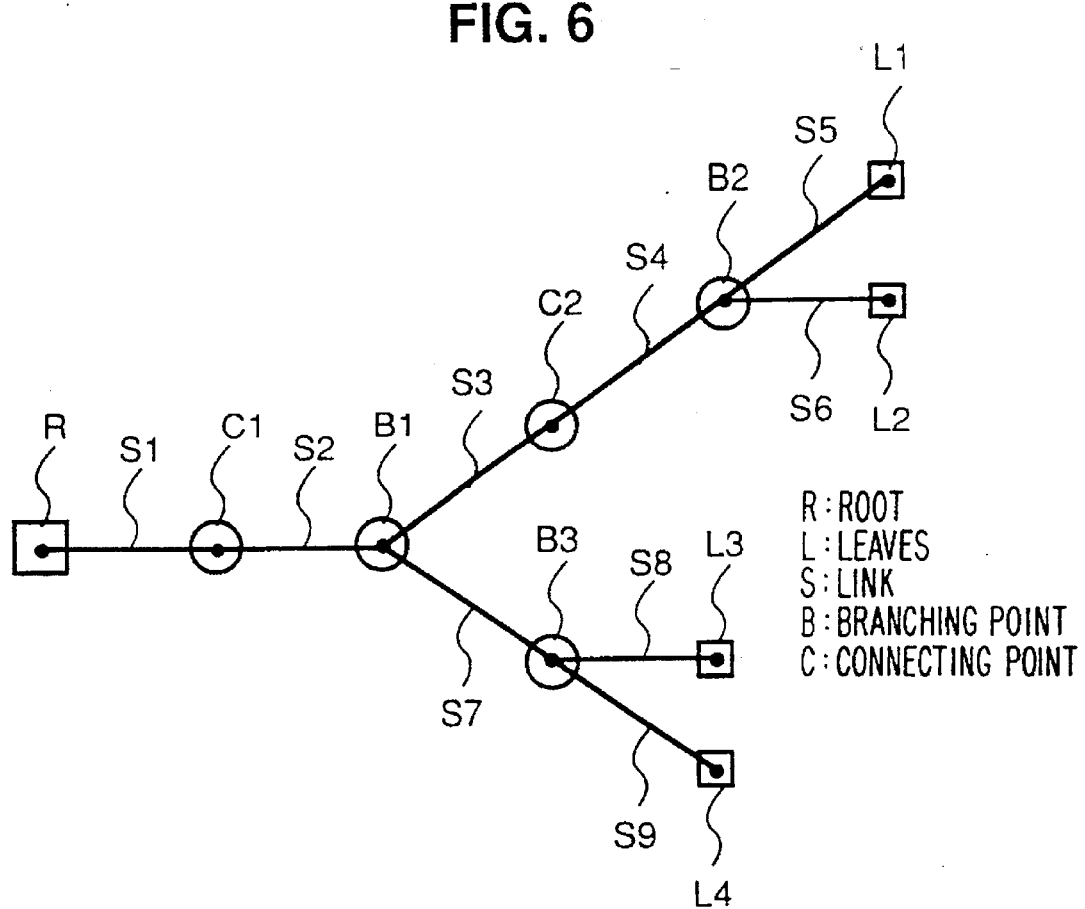
FIG. 6 is a diagram illustrating a constitution of a multipoint connection.
Figure 7A:
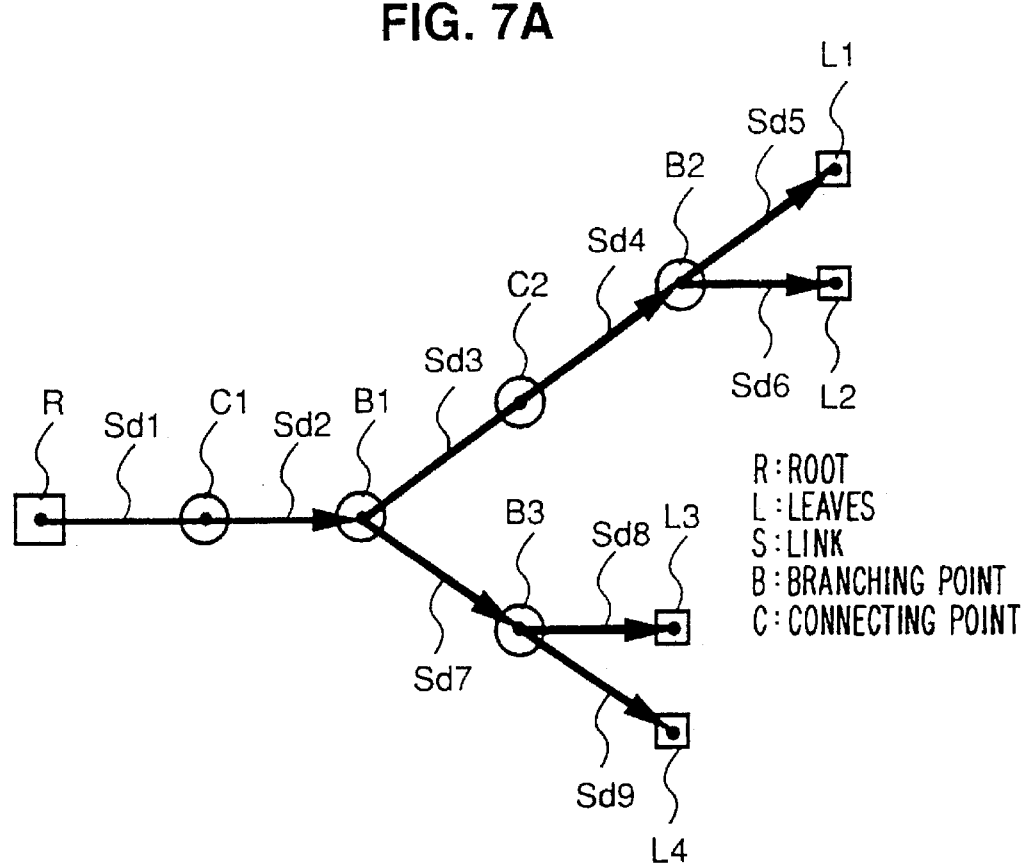
FIGS. 7A and 7B are diagrams illustrating the multipoint connection shown in FIG. 6 depending upon the cases of downward direction and upward direction.
Figure 7B:
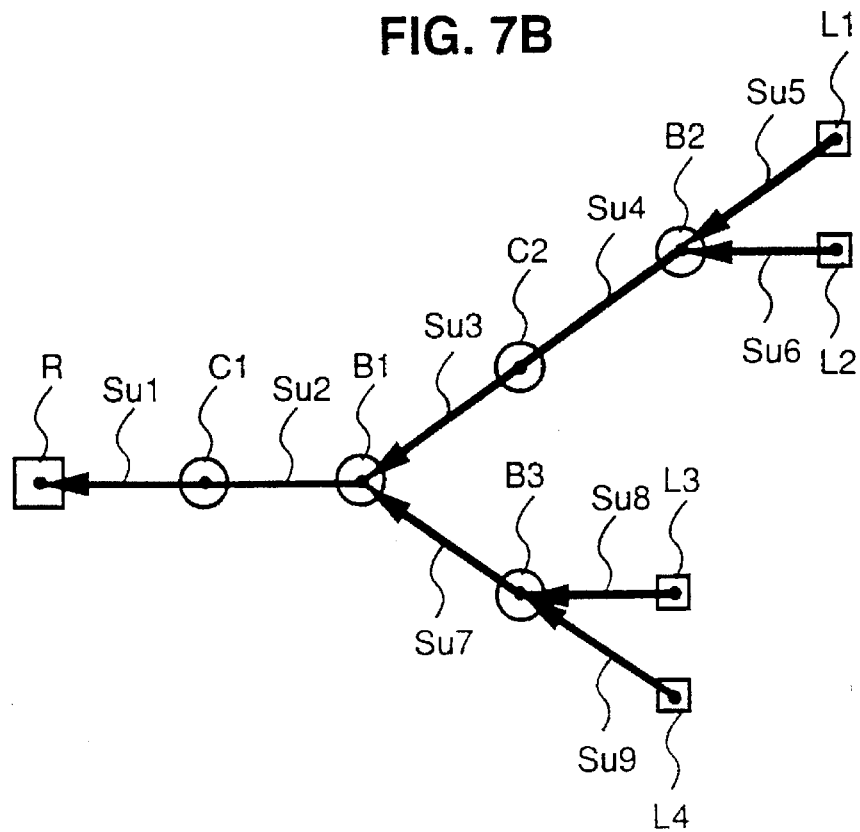
Figure 8A:
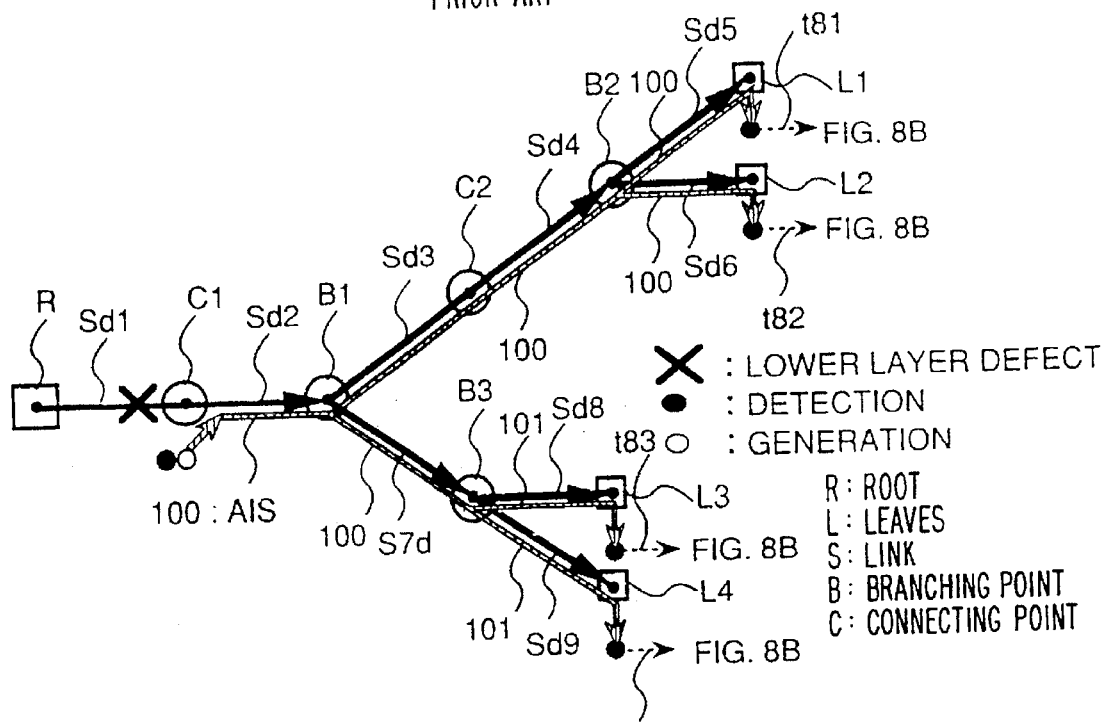
FIGS. 8A and 8B are diagrams for explaining problems inherent in the prior art when the method for defect notification in a point-to-point ATM connection is applied to the multipoint connection of FIG. 6.
Figure 8B:
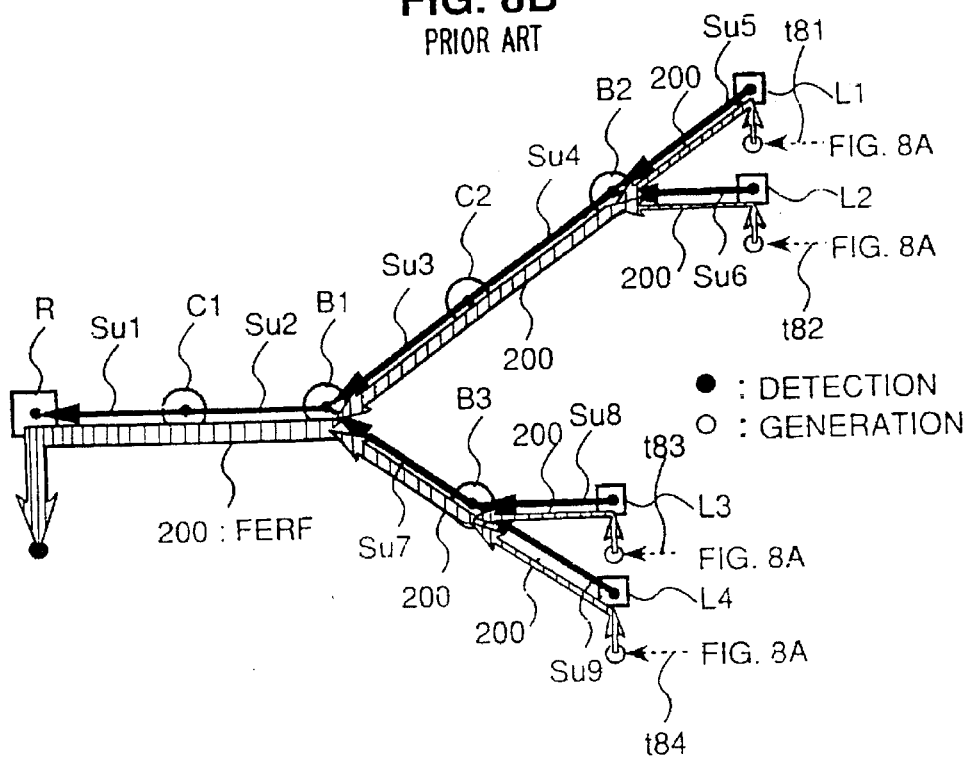

FIGS. 1A and 1B illustrate the flow of defect notification signals according to the present invention when the lower layer becomes defective in a link Sd1 of the first connection in the network shown in FIG. 6. The nodes constituting the network each store in advance constituent data which indicate whether the node is serving as a branching node. Each node, upon receiving the defect notification signal, effects a response operation depending upon the kind of signals received and the serving state of the node indicated by the constituent data.

As shown in FIG. 1A, the connecting point C1 which has detected a defect at the first connection but which is not a branching point, sends a first defect notification signal AIS cell (VP - AIS cell or VC - AIS cell) 100 in the downstream direction of the first connection in compliance with the stipulation of ITU - TI. 610. When receiving the AIS cell, the connecting point B1, which itself, is a branching point, rewrites the payload of the received AIS cell and converts it into a quasi-defect notification signal MAIS cell (VP - MAIS cell or VC - MAIS cell) 101. Then the connecting point B1 sends the quasi-defect notification signal to the branching paths in the downstream direction of the first connection, and sends, as shown in FIG. 1B, a second defect notification signal FERF cell 200 to the second connection in the opposite direction (downstream direction of the second connection). Here, although the received cell is partly rewritten, a new AIS cell may be generated separately from the AIS cell that is received.

Further, for a pre-assigned VCI value of the VP-MAIS, a hexadecimal (H) value "0004" representing an end-to-end AM flow cell or "0003" (H) representing a segment AM flow cell stipulated under ITU-T I.361(March 1993) is applicable, and "101" binary (B) representing an end-to-end AM flow cell or "100" (B) representing a segment AM flow cell stipulated under ITU-T I-361 is applicable for a pre-assigned PTI value of the VC-MAIS. A spare value stipulated under ITU-T I.361 is also applicable for the pre-assigned VCI value of the VP-MAIS as well as for the pre-assigned VCI values of the VP-AIS and VP-FERF.

In FIG. 1A, upon receiving the MAIS cell, the connecting point C2 positioned on the first branching path branched from the connecting point B1 transfers (transmits) the MAIS cell in the downstream direction of the first connection without processing it. A branched connecting point B2 that has received the MAIS cell in the downstream direction of the first connection, transfers the received MAIS cell to the downstream direction of the branching paths without processing it. Upon receiving the thus transmitted MAIS cell, the leaves L1 and L2 execute state transition in compliance with the stipulation of ITU - TL 610. Like the connecting point B2, the connecting point B3 positioned on the second branching path branched from the connection point B1 receives the MAIS cell sent from the connecting point B1 and transfers it to the downstream direction of the branching paths without processing it. Upon receiving the MAIS cell, the leaves L3 and L4 execute state transition in compliance with the stipulation of ITU - TL 610.

In the second connection of the opposite direction as shown in FIG. 1B, the only node that returns FERF 200 back to the root R is the branched connecting point B1 that first detected the first defect detection signal AIS 100. Also the leaves L1 to L4 that receive the quasi-defect detection signal MAIS execute the state transition as a result of detecting the defect as if the first defect detection signal had been received but does not return the second defect detection signal FERF 200 in the downstream direction of the second connection. Therefore, the second defect notification signal is not generated in an overlapped manner on the network, and FERF 200 only arrives at the root R as it is sent from the branched connecting point B1.

Figure 2A:
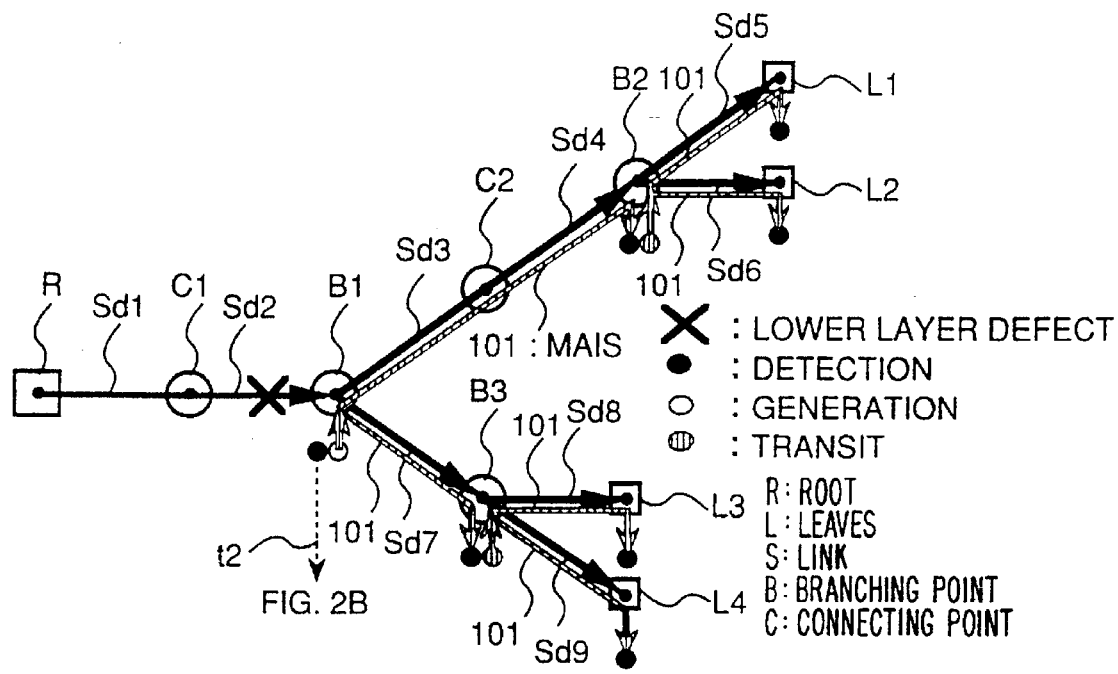
FIGS. 2A and 2B are diagrams for explaining a second example of defect notification according to the present invention.
Figure 2B:
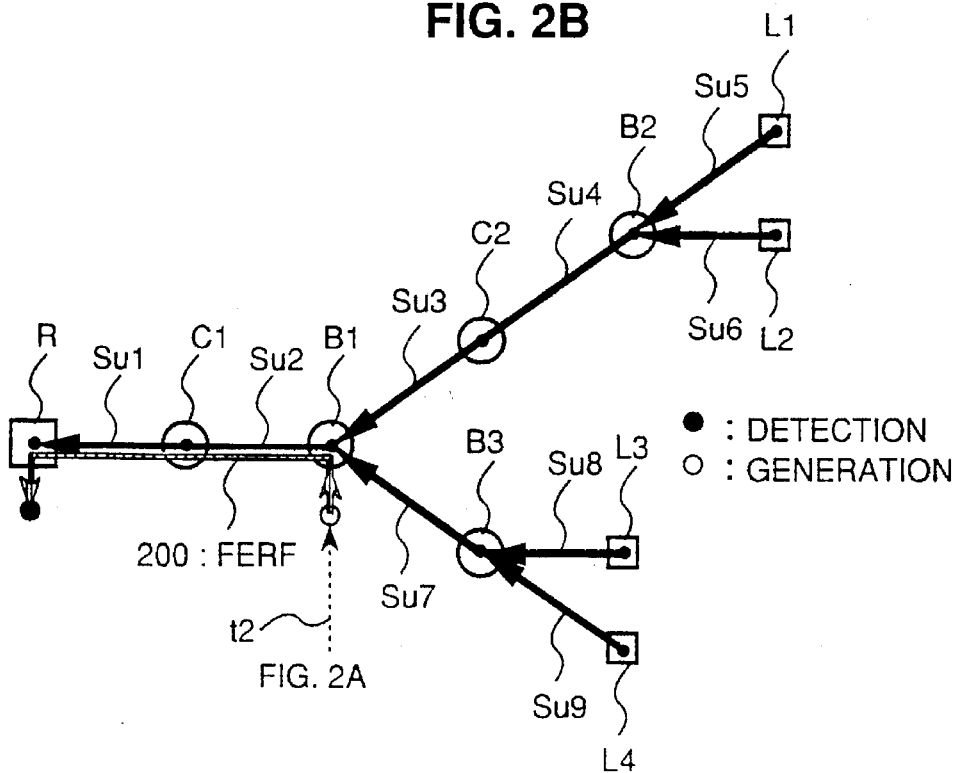

FIGS. 2A and 2B illustrate the flow of a defect notification signal in case the lower layer becomes defective in a link Sd2 of the first connection. When detecting the defect in FIG. 2A the connecting point B1, which itself is a branching point, sends MAIS 101 to the branching paths in the downstream direction of the first connection and generates, as shown in FIG. 2B, FERF 200 to send it in the downstream direction of the second connection of the opposite direction. In this case, operations of the connecting points C2, B2 and B3 and of the leaves L1, L2, L3 and L4 located in the downstream direction of the first connection relative to the connecting point B1 are the same as those of the case illustrated in FIGS. 1A and 1B, and only the connecting point B1 that detected the defective lower layer sends FERF 200 in the downstream direction of the second connection of the opposite direction.

Figure 3A:
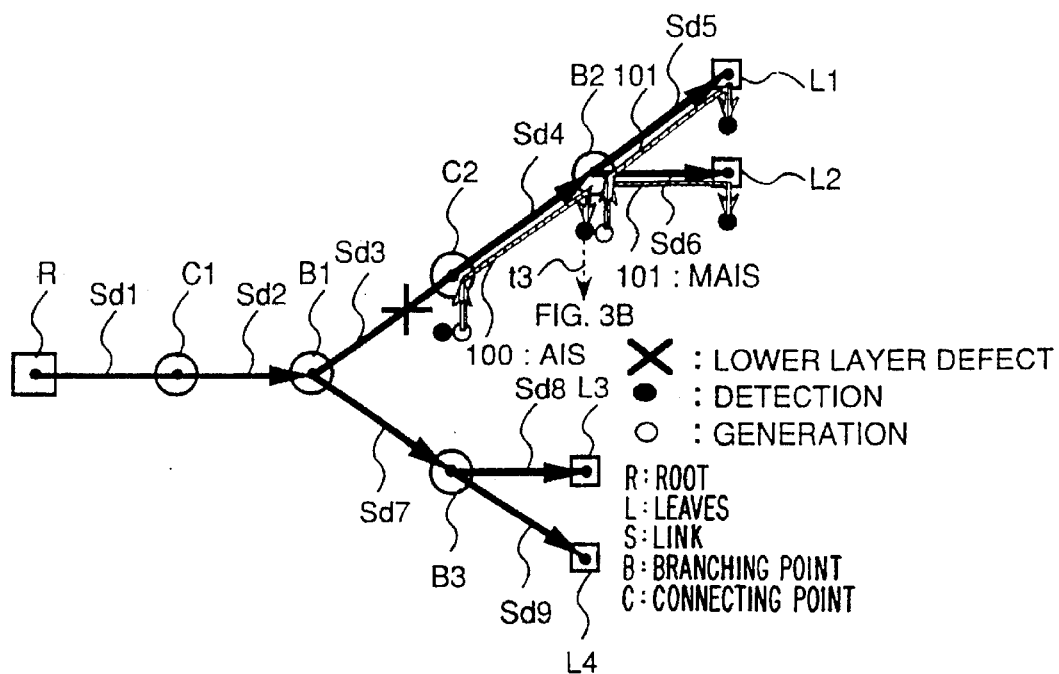
FIGS. 3A and 3B are diagrams for explaining a third example of defect notification according to the present invention.
Figure 3B:
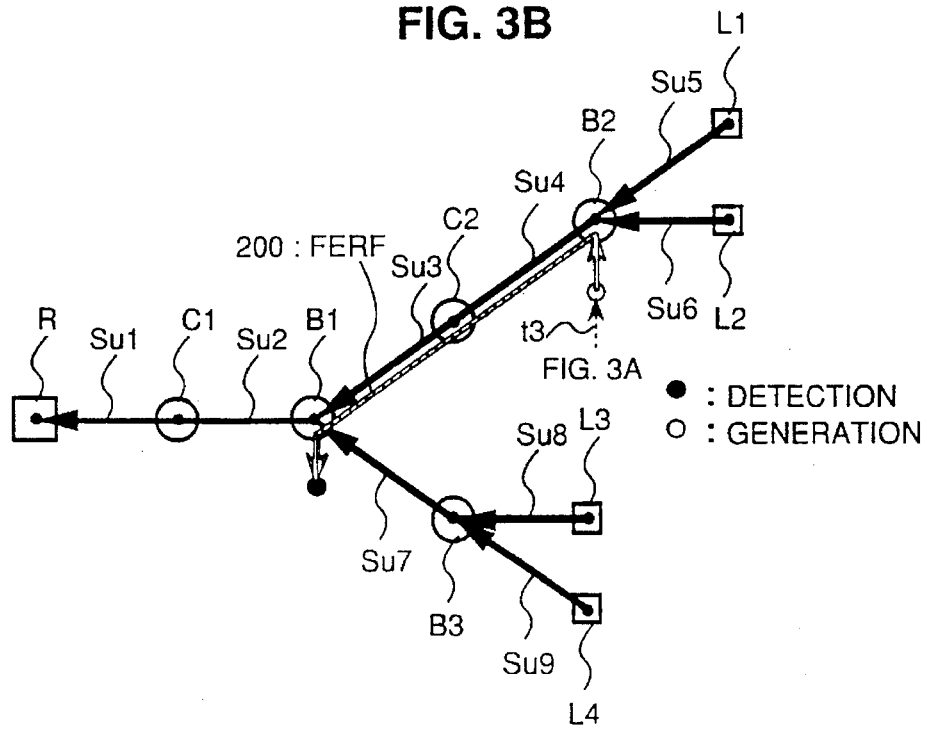

FIGS. 3A and 3B illustrate the flow of defect notification signals when the lower layer becomes defective in a link Sd3 between the branching connections B1 and B2. As shown in FIG. 3A, when detecting a defect, the connecting point C2, not a branching point, sends the first defect notification signal AIS 100 in the downstream direction of the first connection. The connecting point B2 when receiving the AIS cell and being a branching point, rewrites the payload of the received AIS cell to generate a quasi-defect notification signal MAIS cell (VP - MAIS or VC - MAIS) 101, and sends the MAIS cell to the branching paths in the downstream direction of the first connection. As shown in FIG. 3B, the connecting point B2 sends the second defect detection signal FERF 200 in the downstream direction of the second connection of the opposite direction. The leaves L1 and L2 receive the MAIS cell sent from the connecting point B2 and execute state transition in compliance with the stipulation of ITU - TL 610.

As shown in FIG. 3B, FERF 200 is sent in the downstream direction of the second connection of the opposite direction by only the connecting point B2 that has detected AIS 100, and the FERF 200 is received by the connecting point B1 which is the branching point. Upon receiving the FERF 200, the connecting point B1 recognizes that a defect has occurred in the downstream direction of the first connection. In this case, the connecting point B1 terminates the FERF cell but does not transfer the FERF cell to the root R. This is because as shown in this example, in case defect has occurred at a point (Sd3) on the downstream side of the branching point B1, the link can be operated in other sections Sd7, Sd8 and Sd9 on the branching paths, and there is no trouble in the communication between the root R and the leaves L3, L4.

When the connection as a whole is managed by the root R, however, information of a defect must be notified to the root. Even in this case, however, it is not so much required to quickly execute the processing such as disabling the connection as a whole. Therefore, notification from the connecting point B1 to the root R may be effected by communication utilizing a channel of another control plane or management plane, rather than by use of the FERF 200 of the ATM layer.

Figure 4A:
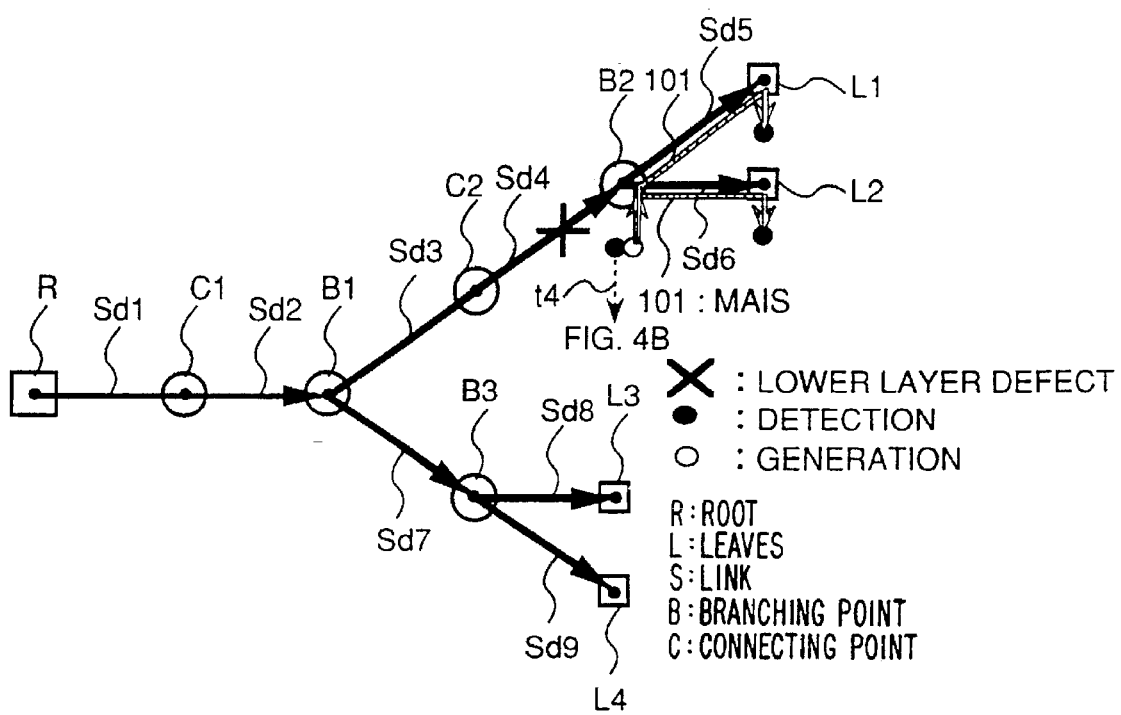
FIGS. 4A and 4B are diagrams for explaining a fourth example of defect notification according to the present invention.
Figure 4B:
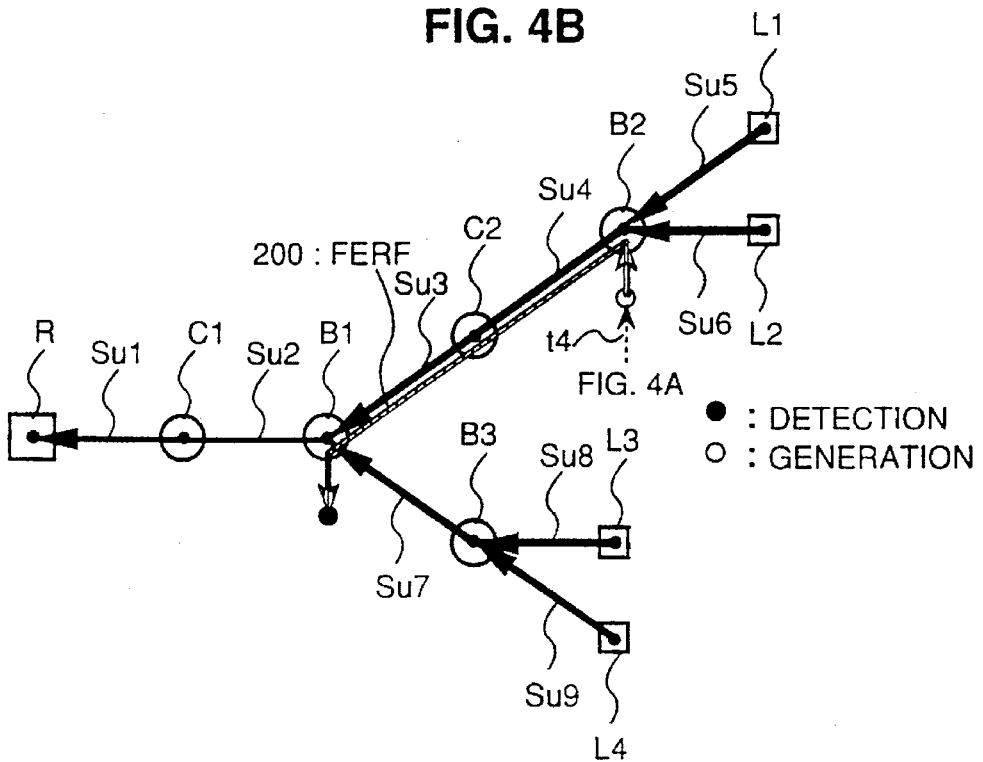

FIGS. 4A and 4B illustrate the flow of a defect notification signal in the case when the lower layer becomes defective between the branching connections B1 and B2 and on a link Sd4 adjacent to the branching connection B2. When a defect occurs on the link Sd4 as shown in FIG. 4A, the connecting point B2 in the downstream direction of the first connection detects the defect. Here, the connecting point B2 is a branching point and generates a quasi-defect detection signal MAIS 101 in compliance with the same operation procedure as that of the connecting point B1 in the example of FIGS. 2A and 2B, sends it to the branching paths in the downstream direction of the first connection and sends, as shown in FIG. 4B, the second defect notification FERF 200 in the downstream direction of the second connection of the opposite direction. Upon receiving the MAIS cell, the leaves L1 and L2 at the branching paths execute state transition in compliance with the stipulation of ITU - TL 610. Here, the only node that issues the FERF 200 in the downstream direction of the second connection of the opposite direction is the connecting point B2 that detected the defect in the lower layer. The FERF 200 is transferred by the connecting point C2 and is received by the connecting point B1 which is a branching point. Like in the case of FIGS. 3A and 3B, the connecting point B1 terminates the FERF 200 and omits the transfer of the FERF 200 to the root R.

Figure 5A:
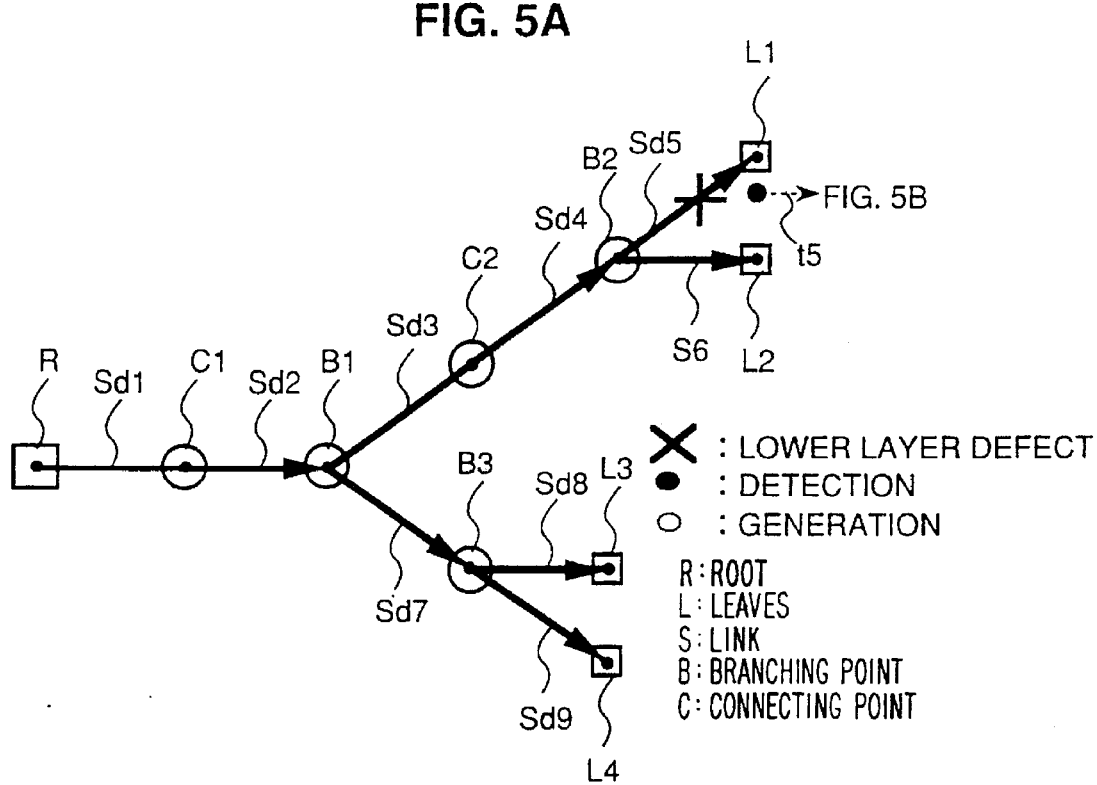
FIGS. 5A and 5B are diagrams for explaining a fifth example of defect notification according to the present invention.
Figure 5B:
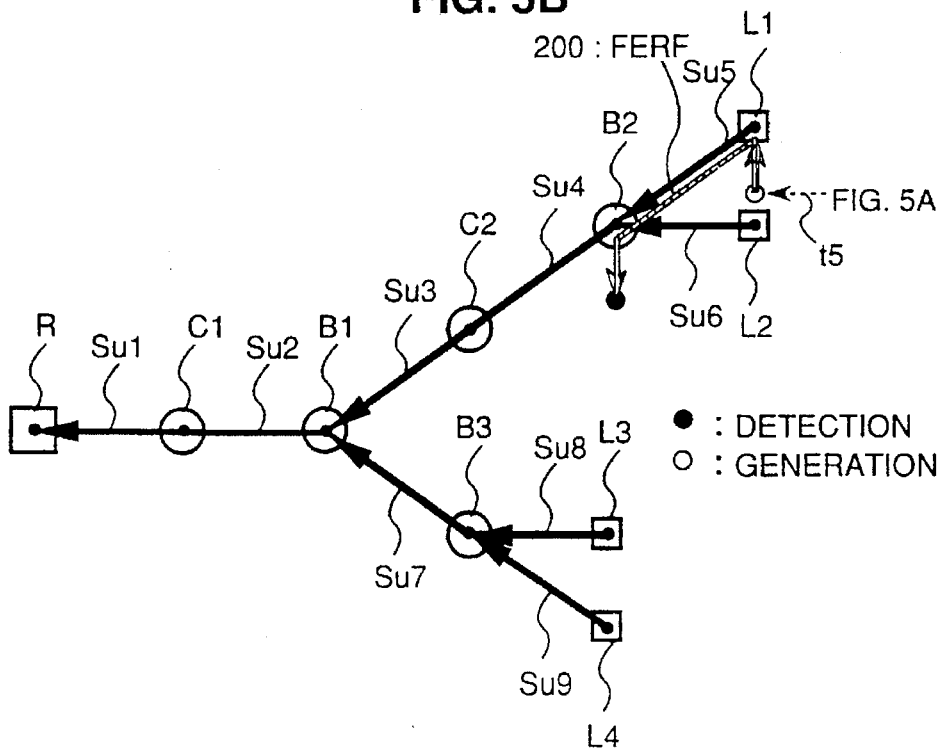

FIGS. 5A and 5B illustrate the flow of a defect notification signal occurring when the lower layer becomes defective on a link Sd5 between the branching connection B2 and the leaf L1. When the link Sd5 becomes defective as shown in FIG. 5A, the leaf L1 on the downstream side detects the defect, executes state transition in compliance with the stipulation of ITU - TL 610, generates a second defect notification signal FERF 200, and sends it in the downstream direction of the second connection of the opposite direction as shown in FIG. 5B. The FERF 200 is received by the connecting point B2 which is the branching point, and is terminated therein just as done by the connecting point B1 in the example of FIG. 4.

Figure 9A:
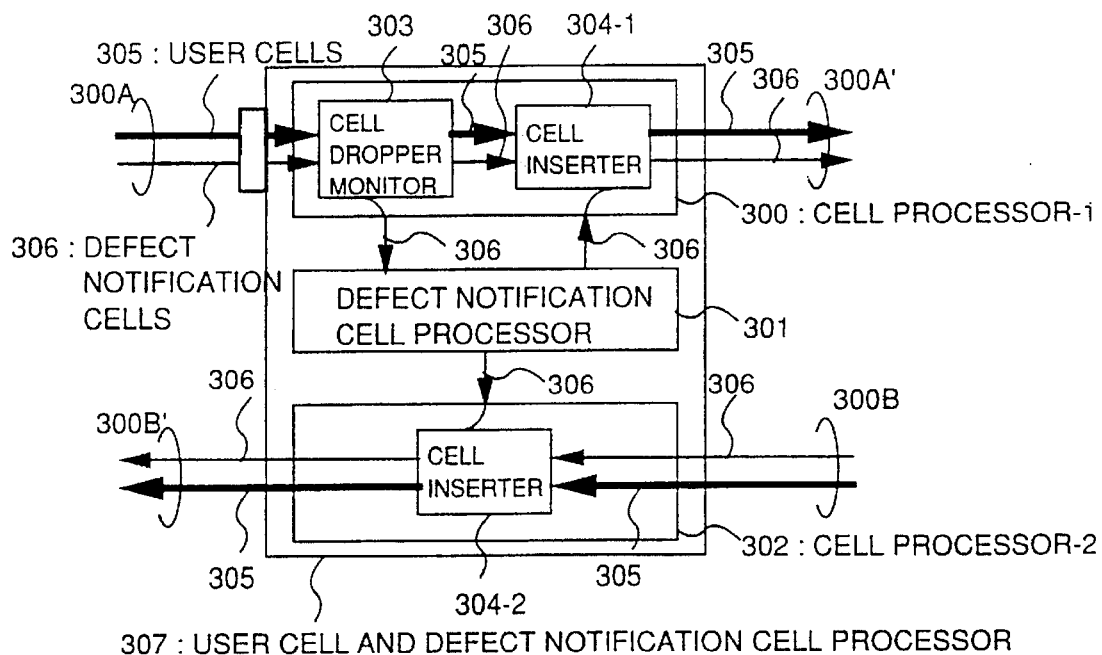
FIGS. 9A and 9B are diagrams illustrating the construction of a node for implementing the present invention.

The node construction for generating the defect notification signal and for transmitting and receiving the defect notification signal will now be described using the connecting point B1 in the network of FIG. 1A as a representative example. FIG. 9A illustrates the construction of a user cell and defect notification cell processor 307 of the connecting point B1 and FIG. 10 illustrates the structure of a table used for controlling the transfer of a defect notification cell. At the connecting point B1 as shown in FIG. 9A, the user cell and defect notification cell processor 307 includes a cell processor 300 and 302 and a defect notification cell processor 301. A cell dropping/monitoring part 303 included in the cell processor 300 picks up a defect notification cell (first defect notification cell VP - AIS cell) 306 out of the user cells 305 received from the section 300A and feeds the defect notification cell 306 to the defect notification cell processor 301.

The defect notification cell processor 301 is equipped with a VP table 400 shown in FIG. 10, and the VP table 400 has a record consisting of a field 402 that indicates whether the VP connection is established or not and a field 403 that indicates the presence or absence of branch, which correspond to the VPIs. Upon receiving the VP - AIS cell, the defect notification cell processor 301 makes reference to the VP table 400 with the VPI attached to the header of the cell as an address, and judges whether the defect notification cell processor itself is a branching point.

For instance, when the VPI of the received VP - AIS is "12", the record corresponding to VPI (12) has an enabled bit "1" indicating that the VP connection is set in the field 402 and has a bit "1" indicating a branching connection set in the field 403. Therefore, the defect notification cell processor 301 learns that the defect notification cell processor itself is a branching node in connection with the VP connection indicated by the VP - AIS cell. In this case, the defect notification cell processor 301 rewrites the payload of the received AIS cell to generate a quasi-defect notification cell VP - MAIS, hands it over to the cell insertion part 304-1 which forms a part of the cell processor 300, generates a second defect notification cell (VP - FERF cell), and hands it over to a cell insertion part 304-2 included in the cell processor 302.

The cell insertion parts 304-1 and 304-2 send the VP - MAIS cell and VP - FERF cell received from the defect notification cell processor 301 to the sections 300A' and 300B'. Though not diagramed, when the connecting point is a branching point node, the downstream side 300A' and the upstream side 300B are divided into a plurality of sections, respectively.

Figure 9B:
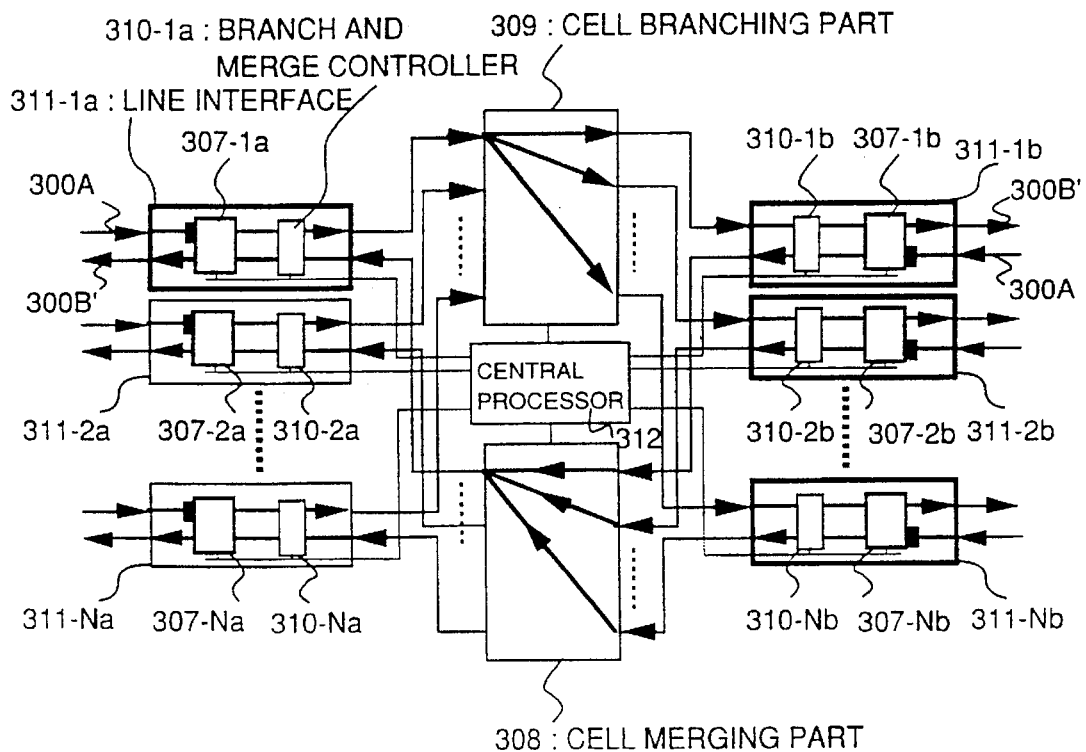

FIG. 9B illustrates the construction of the node device (e.g., an exchange) which support the connecting point B1 including the user cell and the defect notification cell processor 307 illustrated in FIG. 9A. The node device includes a plurality of line interfaces 311 each connected to cell branching part 309 and cell merging part 308. The line interfaces 311 and cell merging and branching parts 308 and 309, respectively are also connected to a central processor 312 which controls operation of the connection point B1 including the setting of operation states in the VP table 400 of the defect notification cell processor 301. Each line interface includes a user cell and defect notification cell processor 307 and a branch and merge controller 310.

The cell branching part 309 causes cells output from, for example, line interface 311-1a to be duplicated and routed to a plurality of line interfaces 311-1b and 311-2b. The cell merging part 308 causes cells inputted from, for example, line interfaces 311-1b and 311-2b to be merged and routed to a single line interface 311-1a.

Described below are the processing operations executed by the connecting points and the end points.

Figure 11:
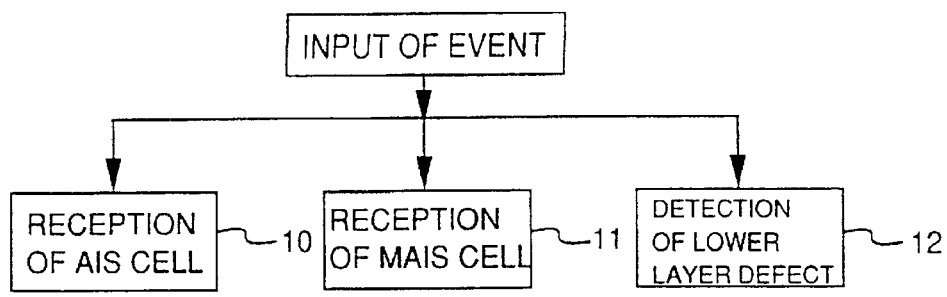
FIG. 11 is a flow chart of the steps used to process the downward connection at the connecting point.
Figure 12:
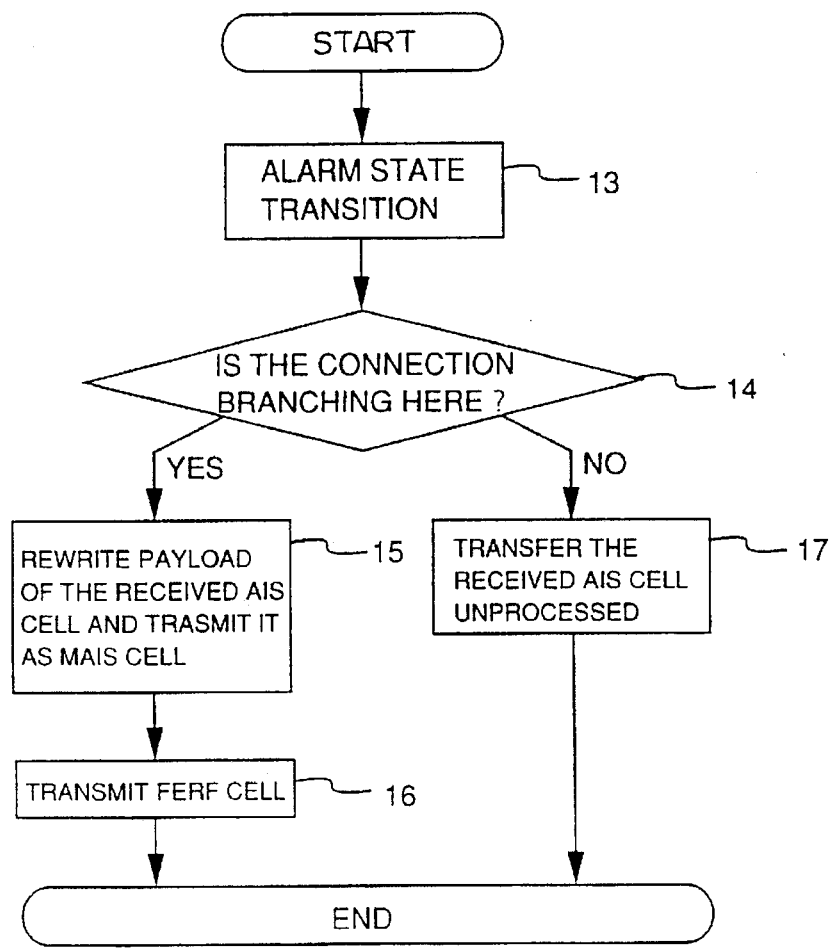
FIG. 12 is a flow chart of the steps used to process the AIS cell reception at the connecting point.

FIG. 11 illustrates the flow of processing in the downward connection that is executed at the connecting point. When an event occurs, the content of the event is analyzed and when an AIS Cell is received, the AIS reception processing illustrated as a flow chart in FIG. 12 is carried out. When a MAIS cell is received, the MAIS reception processing illustrated as a flow chart in FIG. 13 is carried out and when a defect in the lower layer is detected, the defect detection processing illustrated as a flow chart in FIG. 14 for the lower layer is carried out, respectively.

In the AIS reception processing 10 as shown in FIG. 12, the state transition (step 13) is executed as stipulated under ITU - TI. 610 and reference is made to a management data table shown in FIG. 10 to determine whether a connection (VPC specified by VPI of VP - AIS cell or VPC specified by VPI - VCI of VC - AIS cell) corresponding to the received cell is branching at the connecting point or not (step 14). When the connection is branching, the payload of the received AIS cell is rewritten to generate a MAIS cell which is transmitted to the branching paths in the downstream direction of a first connection (step 15). Then a FERF cell is generated and transmitted in the downstream direction of a second connection of the opposite direction (step 16). Here, the transmission of the FERF cell is carried out at a frequency stipulated under ITU - TI. 610. When the connection corresponding to the received cell is not branching at the connecting point, the received AIS cell is transferred without being processed in the downstream direction of the first connection (step 17).

Figure 13:
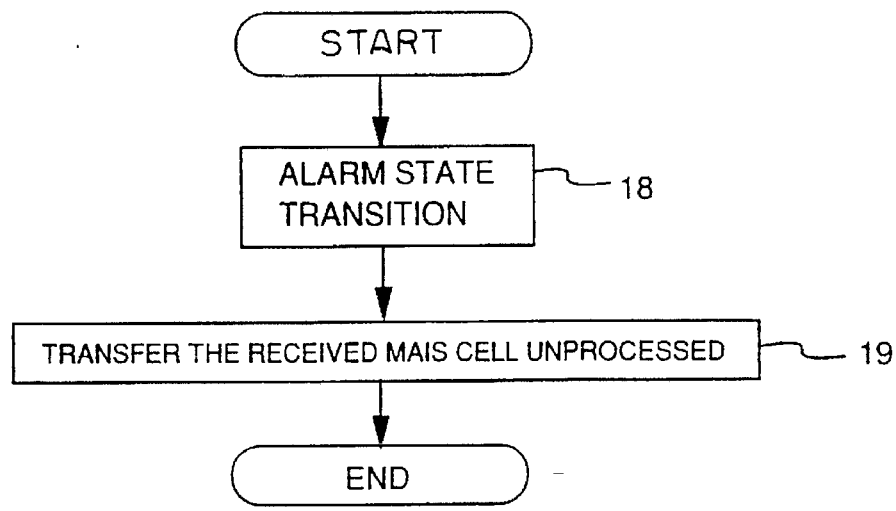
FIG. 13 is a flow chart of the steps used to process the MAIS cell reception at the connecting point.

In the MAIS cell reception processing 11 as shown in FIG. 13, state transition is executed in compliance with the stipulation under ITU - TI. 610 (step 18), and the received MAIS cell is transferred without being processed in the downstream direction of the first connection (step 19).

Figure 14:
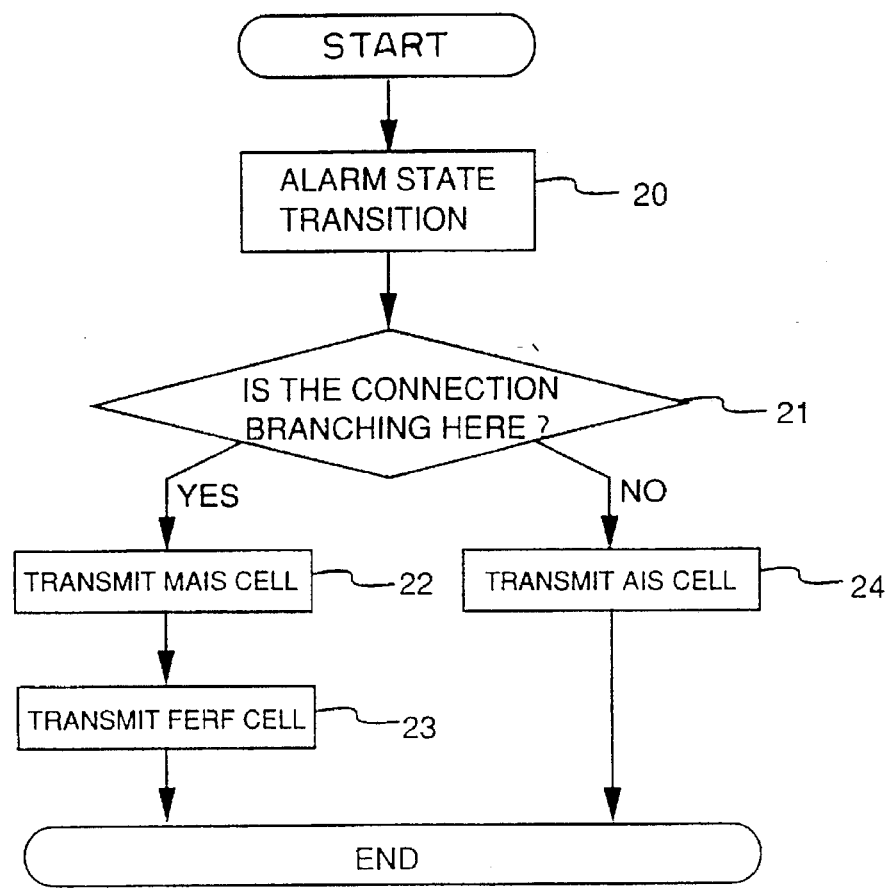
FIG. 14 is a flow chart of the steps used to process the detection of a lower layer defect at the connecting point.

In the lower layer defect detection processing 12 as shown in FIG. 14, state transition (step 20) is executed as stipulated under ITU - TI. 610, and it is determined whether the active connection multiplexed on the connection of the defective lower layer is branched at the connecting point or not (step 21). When the connection is branching, the MAIS cell which is the quasi-defect detection signal is generated and is transmitted in the downstream direction of the first connection (step 22) and, besides, the FERF cell is generated and is transmitted in the downstream direction of the second connection of the opposite direction at a frequency stipulated under ITU - TI. 610 (step 23). When the connection is not branching, the AIS cell that is a first defect detection signal is generated and is transmitted in the downstream direction of the first connection (step 24).

Figure 15:
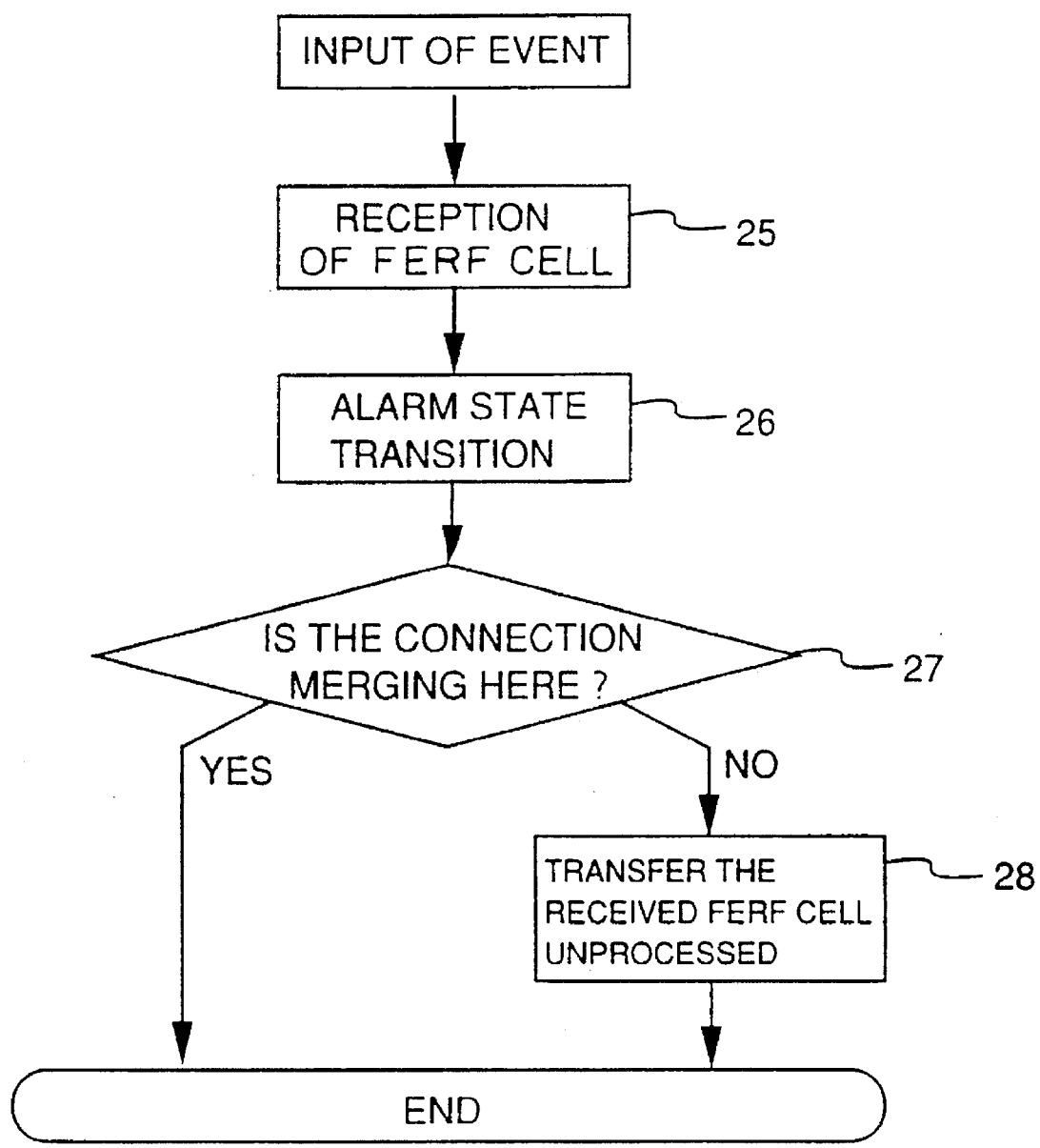
FIG. 15 is a flow chart of the steps used to process the upward connection at the connecting point.

FIG. 15 illustrates the flow of processing in the upward (downstream direction of the second connection) connection executed at the connecting point. When the FERF cell is received (step 25), the state transition is executed in compliance with the stipulation under ITU - TI. 610 (step 26) and it is determined whether the connection is merging with another branching path at the connecting point (step 27). When the connection is merging, the received FERF cell is terminated. When the connection is not merging, the FERF cell is transferred without being processed in the downstream direction of the second connection (step 28).

Figure 16:
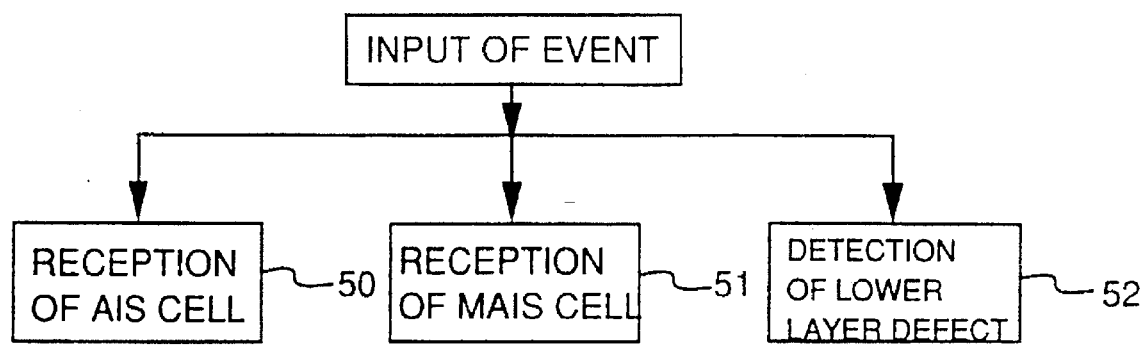
FIG. 16 is a flow chart of the steps used to process the downward connection at an end point.

FIG. 16 illustrates the flow of processing in the downward connection executed at an end point. The end point executes the AIS reception processing 50 illustrated as a flow chart in FIG. 17 when an AIS cell is received, executes the MAIS cell reception processing 51 (FIG. 18) when an MAIS cell is received, and executes the lower layer defect detection processing 52 illustrated as a flow chart in FIG. 19 when a defect in the lower layer is detected.

Figure 17:
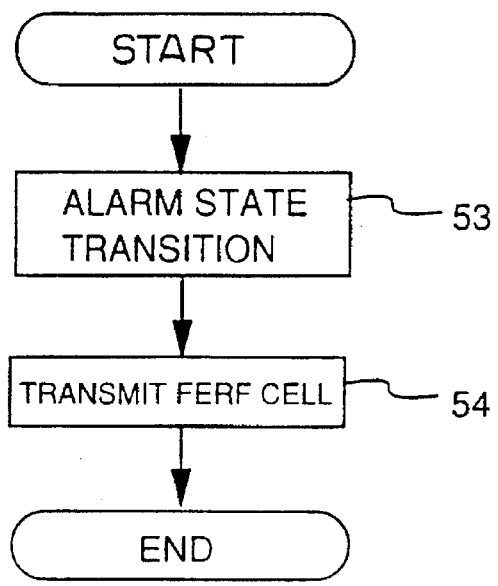
FIG. 17 is a flow chart of the steps used to process the AIS cell reception at an end point.
Figure 18:
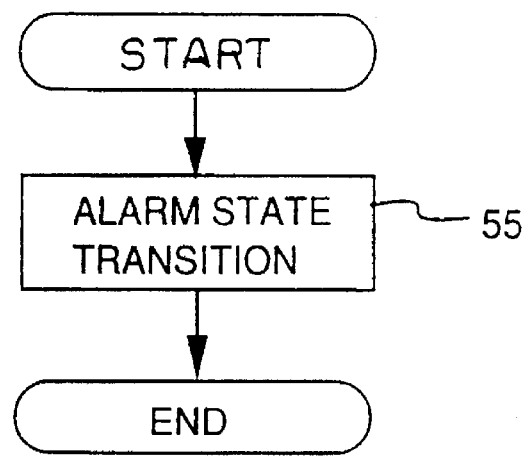
FIG. 18 is a flow chart of the steps used to process the MAIS cell reception at the end point.
Figure 19:
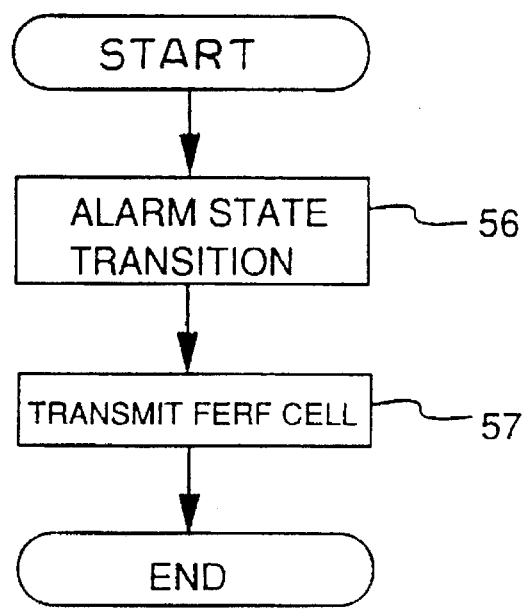
FIG. 19 is a flow chart of the steps used to process the detection of a lower layer defect at the end point.
Figure 20:
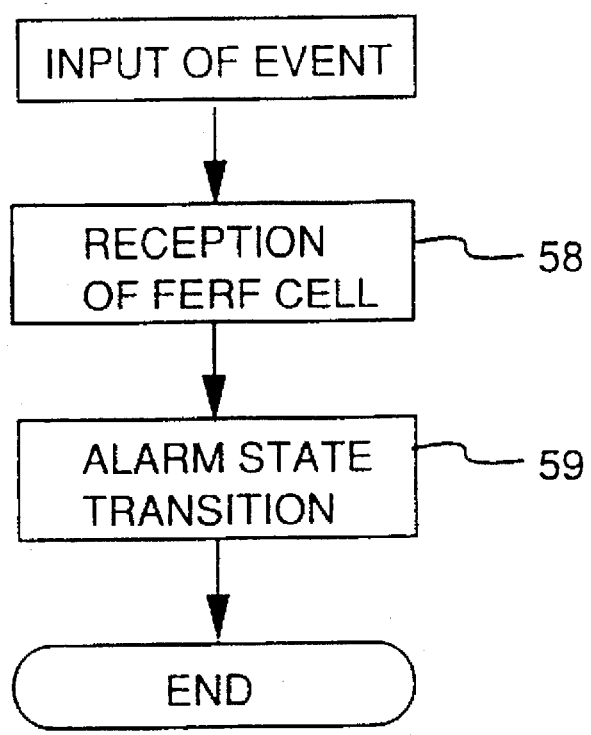
FIG. 20 is a flow chart of the steps used to process the upward connection at the end point.

In the AIS reception processing 50 as shown in FIG. 17, state transition is executed in compliance with the stipulation under ITU - TI. 610 (step 53) and, then, a FERF cell is generated and transmitted in the downstream direction of the second connection of the opposite direction at a frequency stipulated under ITU - TI. 610 (step 54). In the MAIS cell reception processing 51 as shown in FIG. 18, state transition is executed in compliance with the stipulation under ITU - TI. 610 (step 55). In the lower layer defect detection processing 52 as shown in FIG. 19, state transition is executed in compliance with the stipulation under ITU - TI. 610 (step 56), and a FERF cell is generated and then transmitted in the downstream direction of the second connection of the opposite direction that forms a pair with a defective connection at a frequency as stipulated under ITU - TI. 610 (step 57). FIG. 20 illustrates the flow of processing in the upward connection executed at an end or root point. When a FERF cell is received (step 58), the state transition is executed in compliance with ITU - TI. 610 (step 59).

Figure 21:
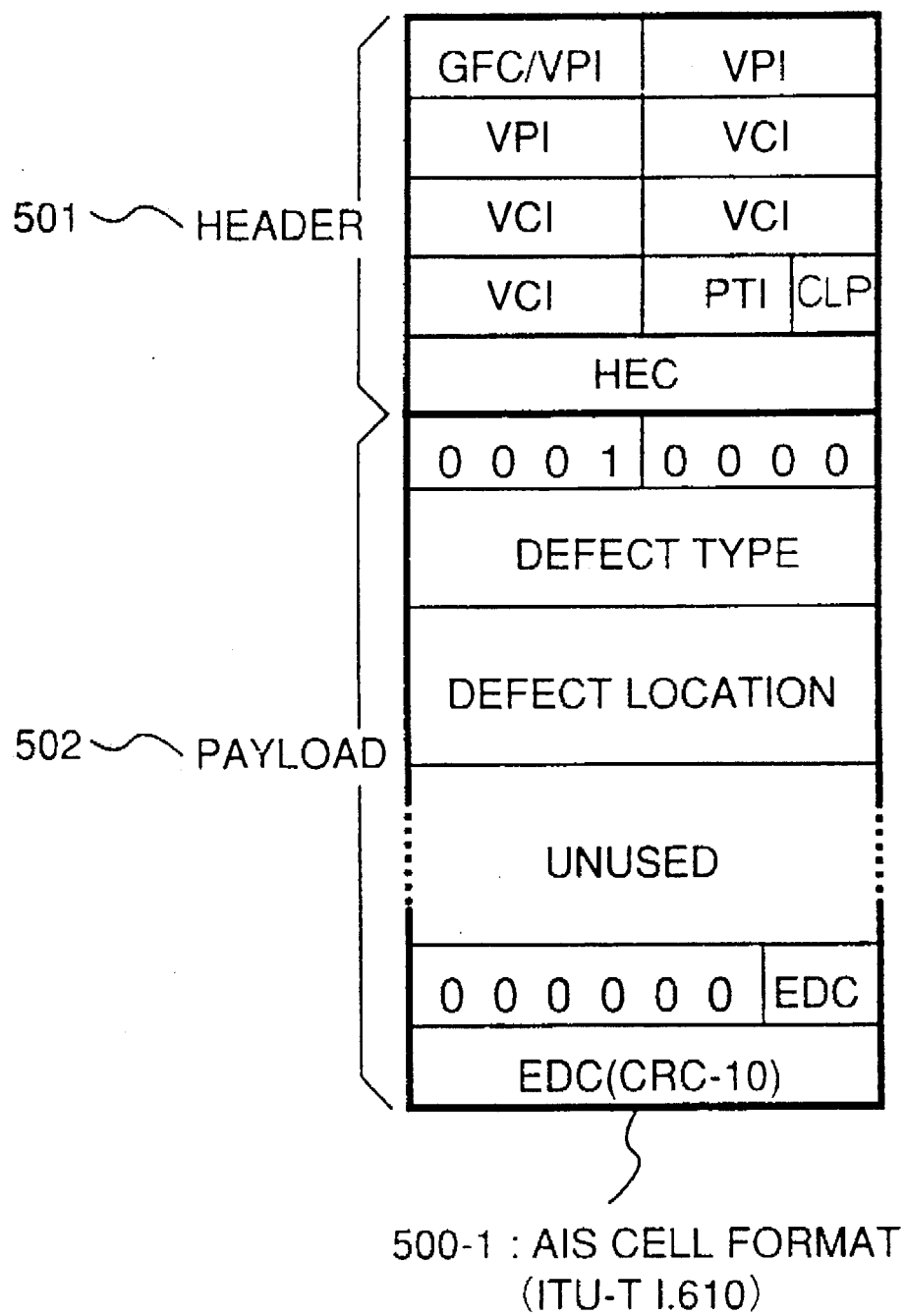
FIG. 21 is a diagram illustrating a format of a AIS cell.

FIG. 21 illustrates a format 500-1 of the AIS cell stipulated under ITU - TI. 610. The AIS cell comprises a header 501 and a payload 502, and the header 501 includes a 4-bit Generic Flow control (GFC)/Virtual Path Identifier (VPI), a 8-bit VPI, a 16-bit Virtual Channel Identifier (VCI), a 3-bit Payload Type Identifier (PTI), and an 8-bit HEC. The payload 502 includes a function type, a defect type code, a data indicating a defective portion, and an error detection code (CRC). The function type "0001000" indicates that the cell is an AIS cell.

Figure 22:
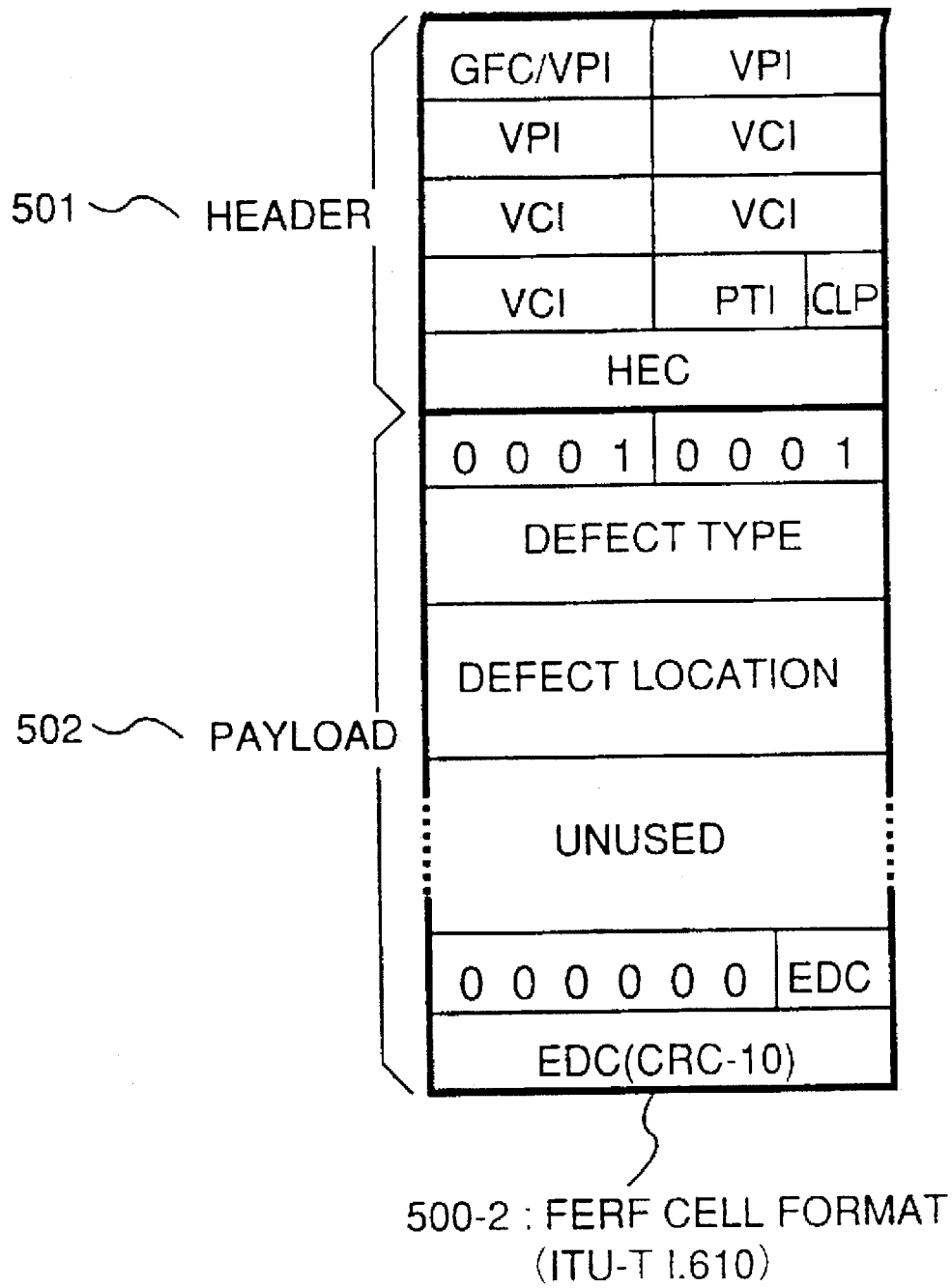
FIG. 22 is a diagram illustrating a format of a FERF cell.

FIG. 22 illustrates a format 500-2 of a FERF cell stipulated under ITU - TI. 610. The FERF cell has the same content as the AIS cell except that the function type has been changed into "00010001" that indicates the FERF cell.

Figure 23:
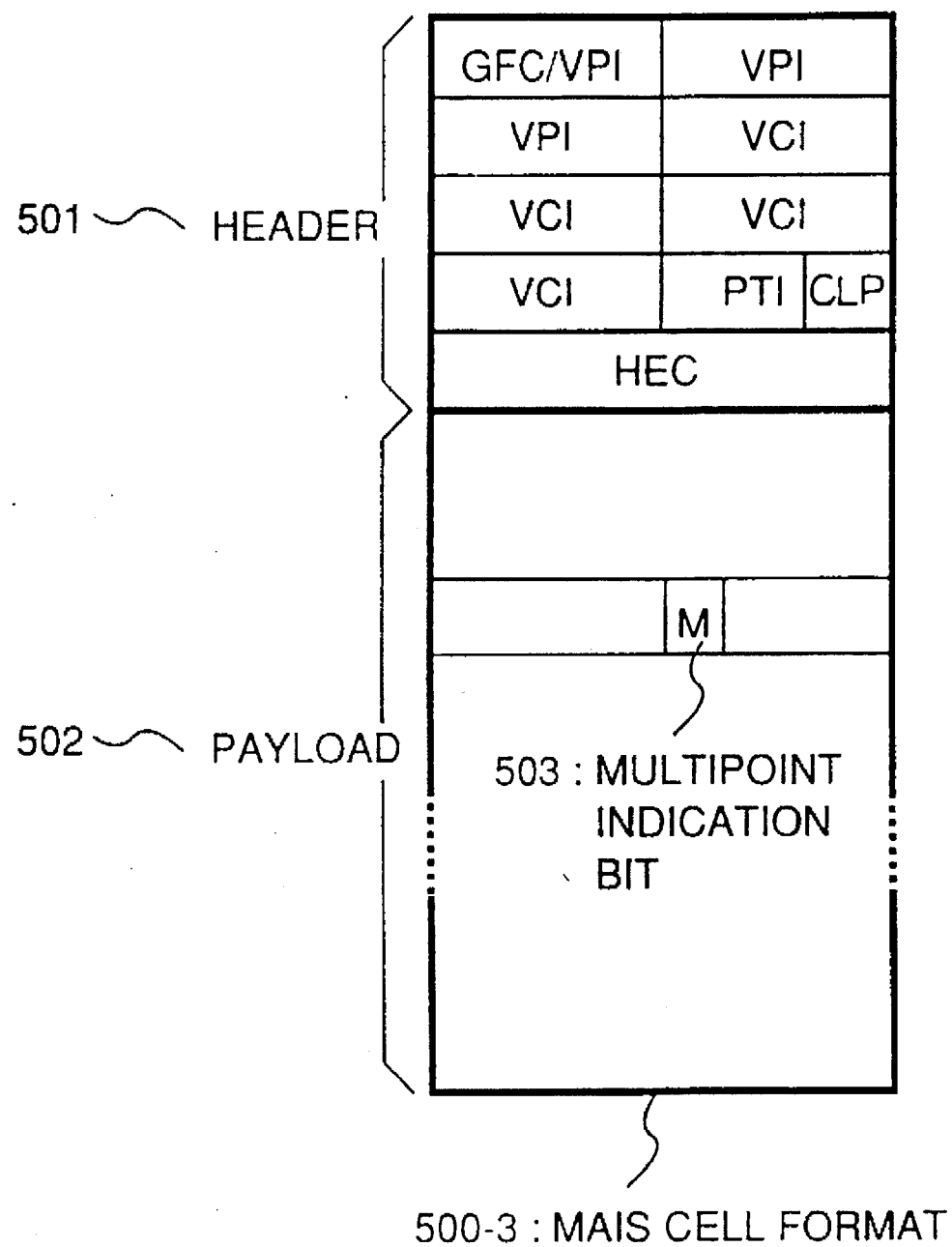
FIG. 23 is a diagram illustrating a format of a MAIS cell.

FIG. 23 illustrates a format 500-3 of the MAIS cell. The MAIS cell should have a structure in which a multipoint indicating bit 503 is provided in a particular field in the payload of the AIS cell format shown in FIG. 21.

Figure 24:
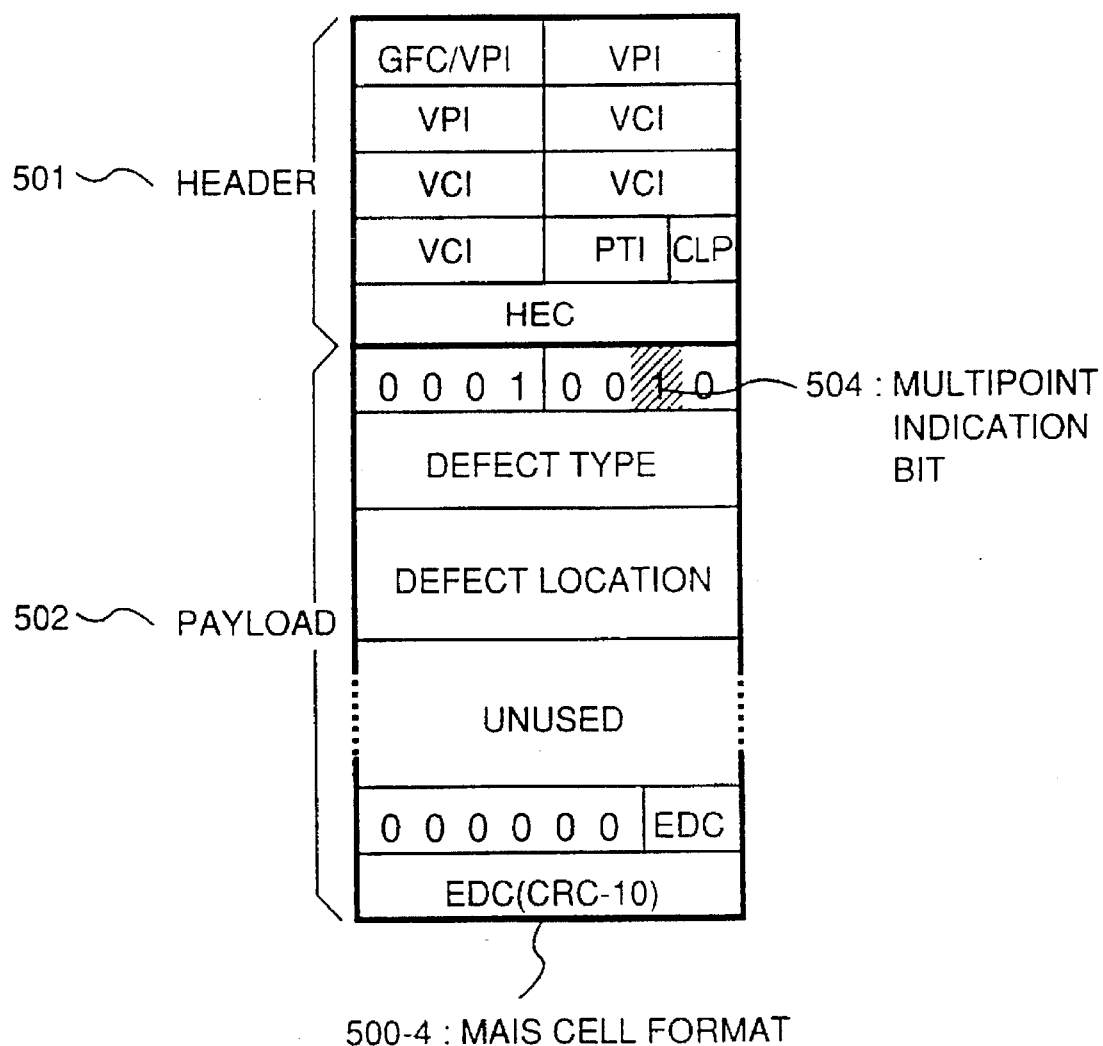
FIG. 24 is a diagram illustrating another format of a MAIS cell.

According to ITU - TI. 610, only "0000", "0001" and "0100" have been determined as values to be set to the lower four bits of the function type field of an Operations and Maintenance (OAM) cell for managing defect, and "0010" remains unassigned. Therefore, the multipoint indicating bit 503 may utilize, for example, a position 504 of the lower second bit in the function type field at the first octet of the payload 502 as shown in FIG. 24. By using the above bit 504 as the multipoint indicating bit, the AIS cell is converted into the MAIS cell at the step 15 in the AIS cell reception processing shown in FIG. 12 by simply rewriting the indicating bit 504 from "0" into "1" before recalculating CRC.

In this embodiment, the defect notification cell 306 once picked up from the cell stream transmitted through equipment (user cell stream 305) is converted into a MAIS cell through the defect notification cell processor 301 and is inserted again in the cell stream transmitted through equipment. However, the bit for converting into the MAIS cell may be rewritten while the AIS cell is in the cell stream transmitted through equipment.

Though the embodiment of the present invention was described above, it should be noted that the present invention is in no way limited to the above embodiment only. In the network of FIG. 6, for instance, when the multipoint connections between the root R and the leaves L1 to L4 are divided into segments "S1+S2", "S3+S4", "S5", "S6", "S7", "S8" and "S9" while designating the connecting points B1, B2 and B3 that are branching points to be "segment end points", then all of these segments become point-to-point connections to which can be applied the defect detection notification method stipulated under ITU - TI. 610. In this case, if the operations of the nodes are so defined that the AIS cell/FERF cell are terminated at the segment end point or at the connection end point instead of terminating the AIS cell/FERF cell at the connection end point, the AIS cell can be terminated at the branching node without the need of notifying it to the end point of the connection, and the FERF cell can be returned back by the branching node. Like in the aforementioned embodiment, therefore, the cells can be transferred to required nodes without generating the defect notification signal in an overlapped manner.

According to the present invention as will be obvious from the foregoing description, the first defect notification signal (VP - AIS cell) is terminated at the branching node and the second defect notification signal (VP - FERF cell) is returned. Therefore, there does not occur such an inconvenience that the second defect notification signals are returned from a plurality of portions in an overlapped manner.

Furthermore, a branching node that has terminated the first defect notification signal sends a quasi-defect notification cell (VP - MAIS cell), instead of the first defect notification signal, to the downstream side of the connection and sequentially transfer it to the nodes on the way, enabling a defect at the connection to be notified to the end point (leaf node) of the connection by utilizing the above approximate defect notification cell. Moreover, if the leaf nodes are so constituted as to generate the second defect notification signal when the above first defect notification signal is received and the second defect notification signal is not generated when the above approximate defect notification signal is received, then it is allowed to prevent the defect notification signals from being generated in an overlapped manner from a plurality of leaf nodes and to prevent undesired defect notification cells from merging on the root node side.

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. A defect notification method in a multipoint ATM network having a pair of first and second connections for transmitting signals in opposite directions and a plurality of nodes provided on said connections for transmitting and receiving signals to and from upstream and downstream directions of said connections, wherein said nodes includes at least one branching node for transmitting and receiving signals to and from branches of said connections, comprising the steps of:

transmitting, when a node detects a defect on the first connection, a first defect notification signal in the downstream direction of the first connection;

transmitting, when a branching node on the first connection receives the first defect notification signal, a second defect notification signal in the downstream direction of the second connection; and sequentially transmitting, by nodes on said second connection, said second defect notification signal in the downstream direction of the second connection.

2. A defect notification method according to claim 1, wherein said second defect notification signal is sequentially transmitted by the nodes on said second connection up to an end point of the second connection.

3. A defect notification method according to claim 1, wherein another branching node on said second connection terminates said second defect notification signal received from a branching node in the upstream direction of a second node.

4. A defect notification method according to claim 1, further comprising the steps of:

transmitting, when said branching node receives said first defect notification signal, a third defect notification signal, related to said first defect notification signal, instead of said first defect notification signal in the downstream direction of said first connection; and sequentially transmitting, by nodes in the downstream direction of said first connection, said third defect notification signal up to an end point of the first connection.

5. A defect notification method according to claim 2, further comprising the steps of:

transmitting, when said branching node receives said first defect notification signal, a third defect notification signal related to said first defect notification signal instead of said first defect notification signal in the downstream direction of said first connection; and sequentially transmitting, by nodes in the downstream direction of said first connection, said third defect notification signal up to an end point of the first connection.

6. A defect notification method according to claim 3, further comprising the steps of:

transmitting, when said branching node receives said first defect notification signal, a third defect notification signal, related to said first defect notification signal, instead of said first defect notification signal in the downstream direction of said first connection; and sequentially transmitting, by nodes in the downstream direction of said first connection, said third defect notification signal up to an end point of the first connection.

7. A defect notification method according to claim 1, wherein said first defect notification signal is a Virtual Path-Alarm Indication Signal (VP-AIS) cell stipulated under International Telecommunication Union-Telecommunication Standardization Sector I 610:B-ISDN Operation and Maintenance Principles and Functions (ITU-TI 610) and said second defect notification signal is a Virtual Path-Far End Receive Failure (VP-FERF) cell stipulated under ITU-TI 610.

8. A defect notification method according to claim 2, wherein said first defect notification signal is a Virtual Path-Alarm Indication Signal (VP-AIS) cell stipulated under International Telecommunication Union-Telecommunication Standardization Sector I 610:B-ISDN Operation and Maintenance Principles and Functions (ITU-TI 610) and said second defect notification signal is a Virtual Path-Far End Receive Failure (VP-FERF) cell stipulated under ITU-TI 610.

9. A defect notification method according to claim 3, wherein said first defect notification signal is a Virtual Path-Alarm Indication Signal (VP-AIS) cell stipulated under International Telecommunication Union-Telecommunication Standardization Sector I 610:B-ISDN Operation and Maintenance Principles and Functions (ITU-TI 610) and said second defect notification signal is a Virtual Path-Far End Receive Failure (VP-FERF) cell stipulated under ITU-TI 610.

10. A defect notification method according to claim 1, wherein said first defect notification signal is a Virtual Channel-Alarm Indication Signal (VC-AIS) cell stipulated under ITU-TI 610 and said second defect notification signal is a Virtual Channel-Far End Receive Failure (VC-FERF) cell stipulated under ITU-TI 610.

11. A defect notification method according to claim 2, wherein said first defect notification signal is a Virtual Channel-Alarm Indication Signal (VC-AIS) cell stipulated under ITU-TI 610 and said second defect notification signal is a Virtual Channel-Far End Receive Failure (VC-FERF) cell stipulated under ITU-TI 610.

12. A defect notification method according to claim 3, wherein said first defect notification signal is a Virtual Channel-Alarm Indication Signal (VC-AIS) cell stipulated under ITU-TI 610 and said second defect notification signal is a Virtual Channel-Far End Receive Failure (VC-FERF) cell stipulated under ITU-TI 610.

13. A defect notification method in according to claim 4, wherein said third defect notification signal is a cell similar to a VP-AIS cell stipulated under ITU-TI 610.

14. A defect notification method in according to claim 5, wherein said third defect notification signal is a cell similar to a VP-AIS cell stipulated under ITU-TI 610.

15. A defect notification method in according to claim 6, wherein said third defect notification signal is a cell similar to a VP-AIS cell stipulated under ITU-TI 610.

16. A defect notification method according to claim 4, wherein said third defect notification signal is a cell similar to a VC-AIS cell stipulated under ITU-TI 610.

17. A defect notification method according to claim 5, wherein said third defect notification signal is a cell similar to a VC-AIS cell stipulated under ITU-TI 610.

18. A defect notification method according to claim 6, wherein said third defect notification signal is a cell similar to a VC-AIS cell stipulated under ITU-TI 610.

19. A defect notification method according to claim 4, wherein a format of said third defect notification signal includes said first defect notification signal and data which indicates multipoint use of said first defect notification signal.

20. A defect notification method according to claim 5, wherein a format of said third defect notification signal includes said first defect notification signal and data which indicates multipoint use of said first defect notification signal.

21. A defect notification method according to claim 6, wherein a format of said third defect notification signal includes said first defect notification signal and data which indicates multipoint use of said first defect notification signal.

22. A defect notification method according to claim 19, wherein said data includes one bit.

23. A defect notification method according to claim 20, wherein said data includes one bit.

24. A defect notification method according to claim 21, wherein said data includes one bit.

25. A defect notification method according to claim 4, further comprising the steps of:

receiving, in said branching node, said first defect notification signal from a cell stream transmitted through equipment on said first connection;

generating said third defect notification signal based upon data contained in a notification signal; and transmitting said third defect notification signal in a main signal stream.

26. A defect notification method according to claim 5, further comprising the steps of:

receiving, in said branching node, said first defect notification signal from a cell stream transmitted through equipment on said first connection;

generating said third defect notification signal based upon data contained in a notification signal; and transmitting said third defect notification signal in a main signal stream.

27. A defect notification method according to claim 6, further comprising the steps of:

receiving, in said branching node, said first defect notification signal from a cell stream transmitted through equipment on said first connection;

generating said third defect notification signal based upon data contained in a notification signal; and transmitting said third defect notification signal in a main signal stream.

28. A defect notification method according to claim 4, further comprising the step of:

generating, in said branching node, said third defect notification signal by rewriting part of said first defect notification signal.

29. A defect notification method according to claim 5, further comprising the step of:

generating, in said branching node, said third defect notification signal by rewriting part of said first defect notification signal.

30. A defect notification method according to claim 6, further comprising the step of:

generating, in said branching node, said third defect notification signal by rewriting part of said first defect notification signal.

31. A defect notification method according to claim 13, wherein a Virtual Channel Identifier (VCI) value assigned to said third defect notification signal similar to said VP-AIS cell is 0004 hexadecimal (H) representing end-to-end OAM flow or 0003(H) representing segment OAM flow stipulated under ITU-TI 361.

32. A defect notification method according to claim 14, wherein a Virtual Channel Identifier (VCI) value assigned to said third defect notification signal similar to said VP-AIS cell is 0004(H) representing end-to-end OAM flow or 0003 (H) representing segment OAM flow stipulated under ITU-TI 361.

33. A defect notification method according to claim 15, wherein a Virtual Channel Identifier (VCI) value assigned to said third defect notification signal similar to said VP-AIS cell is 0004(H) representing end-to-end Operations and Maintenance (OAM) flow or 0003(H) representing segment OAM flow stipulated under ITU-TI 361.

34. A defect notification method according to claim 16, wherein a Payload Type Identifier (PTI) value assigned to said third defect notification signal similar to said VC-AIS cell is 101 Binary (B) representing end-to-end OAM flow or 100(B) representing segment OAM flow stipulated under ITU-TI 361.

35. A defect notification method according to claim 17, wherein a PTI value assigned to said third defect notification signal similar to said VC-AIS cell is 101 (B) representing end-to-end OAM flow or 100(B) representing segment OAM flow stipulated under ITU-TI 361.

36. A defect notification method according to claim 18, wherein a PTI value assigned to said third defect notification signal similar to said VC-AIS cell is 101(B) representing end-to-end OAM flow or 100(B) representing segment OAM flow stipulated under ITU-TI 361.

37. A defect notification method according to claim 7, wherein a VCI value assigned to said VP-AIS cell is a spare value stipulated under ITU-TI 361, and a VCI value assigned to said VP-FERF cell is a spare value stipulated under ITU-TI 361.

38. A defect notification method according to claim 8, wherein a VCI value assigned to said VP-AIS cell is a spare value stipulated under ITU-TI 361, and a VCI value assigned to said VP-FERF cell is a spare value stipulated under ITU-TI 361.

39. A defect notification method according to claim 9, wherein a VCI value assigned to said VP-AIS cell is a spare value stipulated under ITU-TI 361, and a VCI value assigned to said VP-FERF cell is a spare value stipulated under ITU-TI 361.

40. A defect notification method according to claim 13, wherein a VCI value assigned to said third defect notification signal similar to said VP-AIS cell is a spare value stipulated under ITU-TI 361.

41. A defect notification method according to claim 14, wherein a VCI value assigned to said third defect notification signal similar to said VP-AIS cell is a spare value stipulated under ITU-TI 361.

42. A defect notification method according to claim 15, wherein a VCI value assigned to said third defect notification signal similar to said VP-AIS cell is a spare value stipulated under ITU-TI 361.

43. A defect notification method in a multipoint ATM network having a pair of first and second connections for transmitting signals in opposite directions and a plurality of nodes provided on said connections for transmitting and receiving signals to and from upstream and downstream directions of said connections, wherein said nodes includes at least one branching node for transmitting and receiving signals to and from branches of said first and second connections and wherein said first and second connections includes a plurality of pairs of connecting points, each pair of connecting points representing opposite end points of a segment, each connecting point being a node, comprising the steps of:

transmitting, when a node detects a defect on the first connection, a first defect notification signal in the downstream direction on the first connection;

receiving in a segment end point in the downstream direction of said first connection said first defect notification signal;

when said first defect notification signal is received in said segment end point, transmitting a second defect notification signal in the downstream direction on said second connection; and sequentially transmitting, by nodes provided between said node and said segment end point, said first and second defect notification signals in the downstream directions on the first and second connections;

wherein when a branching node is provided on said first and second connections said branching node is designated as said segment end point.

44. A defect notification method according to claim 43, wherein said first defect notification signal is a VP-AIS cell stipulated under ITU-TI 610 and said second defect notification signal is a VP-FERF cell stipulated under ITU-TI 610.

45. A defect notification method according to claim 43, wherein said first defect notification signal is a VC-AIS cell stipulated under ITU-TI 610 and said second defect notification signal is a VC-FERF cell stipulated under ITU-TI 610.

46. A defect notification method according to claim 44, wherein a VCI values assigned to said VP-AIS cell and said VP-FERF cell are spare values stipulated under ITU-TI 361.

47. A cell processor having first, second and third settable states for use within a multipoint ATM network having a plurality of pairs of first and second connection which transmit signals in opposite direction, comprising:

receiving means for receiving defect notification signals from another node located at an upstream side of the first connection; and a processor for transmitting, when said first state has been set and when a first defect notification signal, indicating detection of a defect in the first connection, has been received by said receiving means or a defect in the first connection has been detected, a second defect notification signal in a downstream direction of the second connection and a third defect notification signal related to said first defect notification signal in a downstream direction of the first connection, transmitting, when said second state has been set and when said third defect notification signal has been received by said receiving means, said third defect notification signal in the downstream direction of the first connection, transmitting, when said third state has been received by said receiving means or a defect in the first connection has been detected, said second defect notification signal in the downstream direction of the second connection and when said third state has been set and when said third defect notification signal has been received by said receiving means, performing no transmission in response thereto.

48. A cell processor having a predetermined settable state for use in a multipoint ATM network having a pair of first and second connections which transmit signals in opposite directions, comprising:

means for transmitting, when a defect is detected on the first connection, a first defect notification signal in the downstream direction of the first connection; and means for transmitting, when said predetermined state has been set and when said first defect notification signal has been received from another node, a second defect notification signal in the downstream direction of the second connection and third defect notification signal related to said second defect notification signal in the downstream direction of the first connection.

49. A node device having a plurality of states settable in response to cells for use within a multipoint ATM network having a plurality of pairs of first and second connections which transmit signals in opposite directions, comprising:

cell processor which sets said node device to a first, second or third state in response to a cell; and a line interface for transmitting when said first state has been set and when a first defect notification signal indicating detection of a defect in the first connection, has been received from another node or a defect in the first connection has been detected, a second defect notification signal in the downstream direction of the second connection and a third defect notification signal related to said first defect notification signal in the downstream direction of the first connection, transmitting, when said second state has been set and when said third defect notification signal has been received from said another node, said third defect notification signal in the downstream direction of the first connection, and transmitting, when said third state has been set and when said first defect notification signal has been received from said another node or a defect in the first connection has been detected, said second defect notification signal in the downstream direction of the second connection and when said third state has been set and when said third defect notification signal has been received from said another node performing no transmission in response thereto.

50. A node device having a predetermined state settable in response to a cell for use in a multipoint ATM network having a pair of first and second connections which transmit signals in opposite directions, comprising:

a cell processor which sets said node device to a predetermined state in response to a cell; and a line interface for transmitting, when a defect is detected on the first connection, a first defect notification signal in the downstream direction of the first connection, and transmitting, when said predetermined state has been set and when said first defect notification signal has been received from another node, a second defect notification signal in the downstream direction of the second connection and a third defect notification signal related to said second defect notification signal in the downstream direction of the first connection.

51. A node device for use in an asynchronous transfer mode (ATM) network, said node device having a plurality of line interfaces, each of which is connected to a pair of first and second transmission lines for transmitting signals in opposite directions with respect to one another, each of said line interfaces comprising:

a memory for storing flag information corresponding to a plurality of virtual path identifications, said flag information indicating whether the node device is serving as a branching point for each of a plurality of virtual path connections represented by said virtual path identifications; and a processor, coupled to said memory, for operatively referring to said flag information when a first defect notification signal is received from said first transmission line in order to transfer said first defect notification signal unprocessed in a downstream direction with respect to said first transmission line if the node device is not a branching point of a virtual path designated by said first defect notification signal, and to transmit a second defect notification signal in response to said first defect notification signal in the downstream direction of the second transmission line and a third defect notification signal converted from said first defect notification signal in the downstream direction of the first transmission line if the node device is a branching point of the virtual path.

* * * * *